(12) United States Patent
Liang

(10) Patent No.: US 10,301,200 B2
(45) Date of Patent: May 28, 2019

(54) FLOW DISTRIBUTORS FOR ELECTROCHEMICAL SEPARATION

(71) Applicant: EVOQUA WATER TECHNOLOGIES LLC, Pittsburgh, PA (US)

(72) Inventor: Li-Shiang Liang, Harvard, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 455 days.

(21) Appl. No.: 14/775,950

(22) PCT Filed: Mar. 15, 2013

(86) PCT No.: PCT/US2013/031895
§ 371 (c)(1),
(2) Date: Sep. 14, 2015

(87) PCT Pub. No.: WO2014/142944
PCT Pub. Date: Sep. 18, 2014

(65) Prior Publication Data
US 2016/0009573 A1    Jan. 14, 2016

(51) Int. Cl.
*C02F 1/469* (2006.01)
*B01D 61/50* (2006.01)
*B01D 21/00* (2006.01)

(52) U.S. Cl.
CPC ........ *C02F 1/4693* (2013.01); *B01D 21/0042* (2013.01); *B01D 61/50* (2013.01); *B01D 2313/086* (2013.01); *B01D 2313/10* (2013.01); *B01D 2313/14* (2013.01); *B01D 2313/54* (2013.01); *C02F 2201/46* (2013.01)

(58) Field of Classification Search
CPC ... C02F 1/4693; C02F 1/4695; C02F 2201/46
USPC .................................................. 521/25, 27
See application file for complete search history.

(56) References Cited

U.S. PATENT DOCUMENTS

| | | |
|---|---|---|
| 2,784,158 A | 3/1957 | Bodamer et al. |
| 2,894,894 A | 7/1959 | Kressman et al. |
| 2,923,674 A | 2/1960 | Kressman |
| 2,990,361 A | 6/1961 | Solt |
| 3,933,617 A | 1/1976 | Yamamoto et al. |
| 4,022,692 A | 5/1977 | Janneck |

(Continued)

FOREIGN PATENT DOCUMENTS

| | | |
|---|---|---|
| AU | 2008200413 A1 | 2/2009 |
| CN | 201037122 Y | 3/2008 |

(Continued)

OTHER PUBLICATIONS

"Heed® Current Utilization Efficiency." EET Corporation. Sep. 3, 2009 capture of <http://www.eetcorp.com/Its/graph_HEED1.htm> using WayBack Machine Internet Archive.

(Continued)

*Primary Examiner* — Salil Jain

(57) ABSTRACT

An electrochemical separation system may be modular and may include at least a first modular unit and a second modular unit. Each modular unit may include a cell stack and a frame. The frame may include a manifold system. A flow distributor in the frame may enhance current efficiency. The flow distributor may define a labyrinth flow path for improved current efficiency.

11 Claims, 24 Drawing Sheets

(56) References Cited

U.S. PATENT DOCUMENTS

| | | |
|---|---|---|
| 4,033,850 A | 7/1977 | Kedem et al. |
| 4,217,200 A | 8/1980 | Kedem et al. |
| 4,303,493 A | 12/1981 | Kneifel et al. |
| 4,350,581 A | 9/1982 | Schmoldt et al. |
| 4,569,747 A | 2/1986 | Kedem et al. |
| 4,624,778 A | 11/1986 | Clermont et al. |
| 4,732,656 A | 3/1988 | Hurd |
| 5,116,509 A | 5/1992 | White |
| 5,154,809 A | 10/1992 | Oren et al. |
| 5,292,422 A | 3/1994 | Liang et al. |
| 5,407,553 A | 4/1995 | Herron et al. |
| 5,439,577 A | 8/1995 | Weres et al. |
| 5,681,438 A | 10/1997 | Proulx |
| 6,197,174 B1 | 3/2001 | Barber et al. |
| 6,241,867 B1 | 6/2001 | Mir |
| 6,284,124 B1 | 9/2001 | DiMascio et al. |
| 6,379,518 B1 | 4/2002 | Osawa et al. |
| 6,402,920 B1 | 6/2002 | Sato et al. |
| 6,649,037 B2 | 11/2003 | Liang et al. |
| 6,929,748 B2 | 8/2005 | Avijit et al. |
| 6,929,765 B2 | 8/2005 | Cotton et al. |
| 7,094,325 B2 | 8/2006 | Mack et al. |
| 7,147,785 B2 | 12/2006 | Arba et al. |
| 7,232,507 B2 | 6/2007 | Gattrell et al. |
| 7,335,284 B2 | 2/2008 | Haenni et al. |
| 7,572,359 B2 | 8/2009 | Liang et al. |
| 7,662,267 B2 | 2/2010 | Carson et al. |
| 8,101,058 B2 | 1/2012 | Liang et al. |
| 8,114,260 B2 | 2/2012 | Wilkins et al. |
| 8,627,560 B2 | 1/2014 | Liang et al. |
| 8,741,121 B2 | 6/2014 | Liang et al. |
| 8,956,521 B2 | 2/2015 | Liang et al. |
| 9,139,455 B2 | 9/2015 | Liang et al. |
| 9,187,350 B2 | 11/2015 | Liang et al. |
| 9,227,858 B2 | 1/2016 | Liang et al. |
| 2001/0037942 A1 | 11/2001 | Schmidt et al. |
| 2002/0011413 A1 | 1/2002 | DiMascio et al. |
| 2003/0019818 A1 | 1/2003 | Carson et al. |
| 2003/0079992 A1 | 5/2003 | Wilkins et al. |
| 2003/0089609 A1 | 5/2003 | Liang et al. |
| 2003/0173222 A1 | 9/2003 | Srinivasan et al. |
| 2003/0235749 A1 | 12/2003 | Haltiner et al. |
| 2004/0159543 A1 | 8/2004 | Boyer et al. |
| 2004/0178075 A1 | 9/2004 | Sato |
| 2004/0206627 A1 | 10/2004 | Bejtlich et al. |
| 2005/0037254 A1 | 2/2005 | Skala et al. |
| 2005/0051485 A1 | 3/2005 | Saini |
| 2005/0064266 A1 | 3/2005 | Abdou et al. |
| 2005/0087446 A1 | 4/2005 | Liang et al. |
| 2005/0103630 A1 | 5/2005 | Ganzi et al. |
| 2006/0016685 A1 | 1/2006 | Hawkins et al. |
| 2006/0144787 A1 | 7/2006 | Schmidt et al. |
| 2006/0163056 A1 | 7/2006 | Grebenyuk et al. |
| 2006/0166053 A1 | 7/2006 | Badding et al. |
| 2006/0231495 A1 | 10/2006 | Freydina et al. |
| 2006/0249390 A1 | 11/2006 | Yan et al. |
| 2006/0254919 A1 | 11/2006 | Jangbarwala |
| 2006/0263646 A1 | 11/2006 | Seale |
| 2007/0215474 A1 | 9/2007 | Batchelder et al. |
| 2008/0073215 A1 | 3/2008 | Barber et al. |
| 2008/0105551 A1 | 5/2008 | Wang et al. |
| 2008/0182147 A1 | 7/2008 | Blake et al. |
| 2008/0245667 A1 | 10/2008 | Jones et al. |
| 2010/0086819 A1 | 4/2010 | Gemba et al. |
| 2010/0163471 A1 | 7/2010 | Elyanow et al. |
| 2010/0181257 A1 | 7/2010 | Frechet et al. |
| 2010/0282689 A1 | 11/2010 | Ganzi et al. |
| 2010/0326833 A1 | 12/2010 | Messalem et al. |
| 2012/0118729 A1* | 5/2012 | Liang ................. B01D 61/48 204/267 |
| 2012/0118738 A1 | 5/2012 | Liang et al. |

FOREIGN PATENT DOCUMENTS

| | | | |
|---|---|---|---|
| CN | 201482423 | * 5/2010 | ............ B01D 61/50 |
| CN | 201482423 U | 5/2010 | |
| EP | 1387428 A2 | 2/2004 | |
| EP | 1598318 A1 | 11/2005 | |
| EP | 2131430 A1 | 12/2009 | |
| GB | 852272 A | 10/1960 | |
| JP | 2004-243194 A | 9/2004 | |
| JP | 2009-095821 A | 5/2009 | |
| SU | 527197 A1 | 9/1976 | |
| WO | 199406548 A1 | 3/1994 | |
| WO | 2003026049 A2 | 3/2003 | |
| WO | 2005092799 A1 | 10/2005 | |
| WO | 2008036461 A1 | 3/2008 | |
| WO | 2008048656 A2 | 4/2008 | |
| WO | 2009051612 A1 | 4/2009 | |
| WO | 2009077992 A2 | 6/2009 | |
| WO | 2011163278 A2 | 12/2011 | |

OTHER PUBLICATIONS

"Laboratory Electrodialysis Cell Series," PCA Electrodialysis Cells, http://www.pca-gmbh.com/pccell/labcell.htm printed May 14, 2013.

Holt, "The path of least resistance," Electrical Construction and Maintenance, Jul. 1, 2001, <http://ecmweb.com/content/path-least-resistance>.

Sadrzadeh et al., "Treatment of sea water using electrodialysis: Current efficiency evaluation," Oct. 2, 2009, Desalination, vol. 249, Issue 1, pp. 279-285.

Tanaka et al. "A Computer Simulation of Ion Exchange Membrane Electrodialysis for Concentration of Seawater". Membrane Water Treatment, vol. 1, No. 1 (2010) pp. 13-37.

Von Gottberg, Antonia, "New High-Performance Spacers in Electrodialysis Reversal (EDR) Systems," GE Power & Water, Water & Process Technologies Technical Paper, General Electric Company (2010; originally published in Proceedings of 1998 AWWA Annual Conference, Jun. 21-25, 1998, Dallas, Texas), pp. 1-8.

* cited by examiner

Tortuosity = Length of flow path / direct distance (L)

FLOW DISTRIBUTORS FOR ELECTROCHEMICAL SEPARATION

FIELD OF THE DISCLOSURE

Aspects relate generally to electrochemical separation and, more particularly, to flow distributors for electrochemical separation systems.

SUMMARY

In accordance with one or more aspects, a flow distributor for electrochemical separation may comprise a plurality of vertical passages configured to transport fluid to or from at least one compartment of an electrochemical separation device, a plurality of horizontal passages in fluid communication with the plurality of vertical passages and in fluid communication with a fluid manifold associated with the electrochemical separation device, and a plurality of baffles arranged at junctions between the plurality of vertical passages and the plurality of horizontal passages to define a labyrinth flow path between the fluid manifold and the electrochemical separation device.

In accordance with one or more aspects, a modular flow distributor for electrochemical separation may comprise a first component defining a plurality of vertical passages configured to transport fluid to or from at least one compartment of an electrochemical separation device, and a second component defining a plurality of horizontal passages and comprising a plurality of baffles, the second component configured to mate with the first component such that the baffles are arranged with the plurality of vertical passages and the plurality of horizontal passages to form a labyrinth flow path between the electrochemical separation device and a fluid manifold.

In accordance with one or more aspects, a modular electrochemical separation unit may comprise a cell stack defining a plurality of alternating ion depleting compartments and ion concentrating compartments, a frame surrounding the cell stack and including a manifold system configured to facilitate fluid flow through the cell stack, and a flow distributor positioned at least partially within the frame, the flow distributor defining a labyrinth flow path between the manifold system and the cell stack to promote uniform fluid flow distribution and to reduce current loss within the cell stack.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
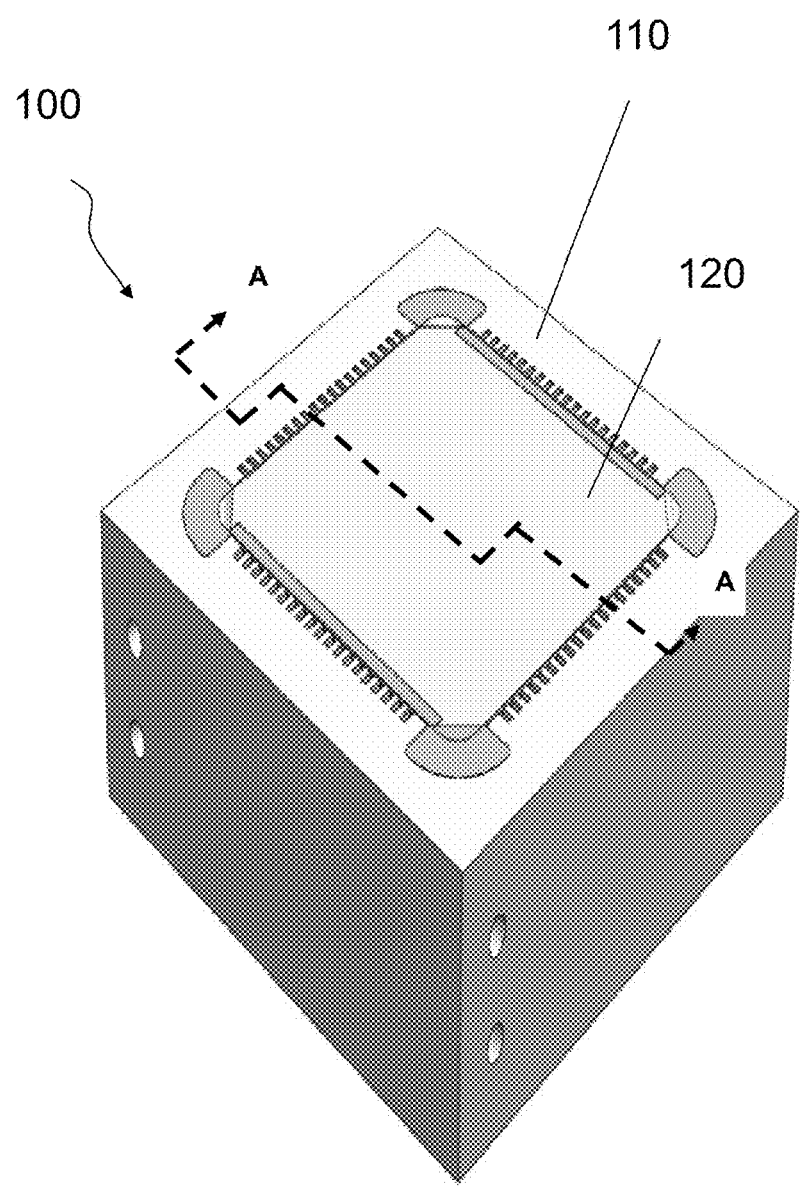
FIG. 1 is a schematic illustration of a stack of cell pairs in a frame of unitary construction in accordance with one or more embodiments.

In accordance with one or more embodiments, electrochemical separation systems and methods may be characterized by enhanced efficiency and overall flexibility for application in various treatment processes. The electrochemical separation systems may generally be modular as described herein. In some embodiments, cross-flow electrochemical separation devices, such as cross-flow electrodialysis (ED) devices, may be implemented as an alternative to traditional plate-and-frame devices. In some embodiments, current inefficiency in cross-flow electrochemical separation devices may be reduced. In at least certain embodiments, current inefficiency due to current bypass through inlet and outlet manifolds may be addressed. Energy consumption and membrane requirements may also be reduced, both of which may affect life cycle cost in various applications. In some embodiments, at least 85% membrane utilization may be achieved. In some specific embodiments, the process efficiency of cross-flow ED devices may be significantly improved. In some specific embodiments, the efficiency of electrochemical separation processes may be improved for desalination of brackish water, seawater and brines, such as from oil and gas production. In at least some embodiments, the cost competitiveness of ED may be improved in comparison to RO which is a dominant technology for desalination.

Devices for purifying fluids using electrical fields are commonly used to treat water and other liquids containing dissolved ionic species. Two types of devices that treat water in this way are electrodeionization and electrodialysis devices. Within these devices are concentrating and diluting compartments separated by ion-selective membranes. An electrodialysis device typically includes alternating electroactive semipermeable anion and cation exchange membranes. Spaces between the membranes are configured to create liquid flow compartments with inlets and outlets. An applied electric field imposed via electrodes causes dissolved ions, attracted to their respective counter-electrodes, to migrate through the anion and cation exchange membranes. This generally results in the liquid of the diluting compartment being depleted of ions, and the liquid in the concentrating compartment being enriched with the transferred ions.

Electrodeionization (EDI) is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuously, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance. Further, such electrochemical devices may comprise electrically active membranes, such as semi-permeable or selectively permeable ion exchange or bipolar membranes. Continuous electrodeionization (CEDI) devices are EDI devices known to those skilled in the art that operate in a manner in which water purification can proceed continuously, while ion exchange material is continuously recharged. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices typically do not contain electroactive media between the membranes. Because of the lack of electroactive media, the operation of ED may be hindered on feed waters of low salinity because of elevated electrical resistance. Also, because the operation of ED on high salinity feed waters can result in elevated electrical current consumption, ED apparatus have heretofore been most effectively used on source waters of intermediate salinity. In ED based systems, because there is no electroactive media, splitting water is inefficient and operating in such a regime is generally avoided.

In CEDI and ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. In some embodiments, a cell pair may refer to a pair of adjacent concentrating and diluting compartments. As water flows through the depletion compartments, ionic and other charged species are typically drawn into concentrating compartments under the influence of an electric field, such as a DC field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream.

In CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. At the electrode/liquid interfaces, electrochemical half cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion. Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. The reaction products of the electrode compartments, such as generated chlorine gas and sodium hydroxide, can be utilized in the process as needed for disinfection purposes, for membrane cleaning and defouling purposes, and for pH adjustment purposes.

Plate-and-frame and spiral wound designs have been used for various types of electrochemical deionization devices including but not limited to electrodialysis (ED) and electrodeionization (EDI) devices. Commercially available ED devices are typically of plate-and-frame design, while EDI devices are available in both plate and frame and spiral configurations. One or more embodiments relate to devices that may purify fluids electrically. Liquids or other fluids to be purified enter the purification device and, under the influence of an electric field, are treated to produce an ion-depleted liquid. Species from the entering liquids are collected to produce an ion-concentrated liquid.

In accordance with one or more embodiments, an electrochemical separation system or device may be modular. Each modular unit may generally function as a sub-block of an overall electrochemical separation system. A modular unit may include any desired number of cell pairs. In some embodiments, the number of cell pairs per modular unit may depend on the total number of cell pairs and passes in the separation device. It may also depend on the number of cell pairs that can be thermally bonded and potted in a frame with an acceptable failure rate when tested for cross-leaks and other performance criteria. The number can be based on statistical analysis of the manufacturing process and can be increased as process controls improve. In some non-limiting embodiments, a modular unit may include about 50 cell pairs. Modular units may be individually assembled and quality control tested, such as for leakage, separation performance and pressure drop prior to being incorporated into a larger system. In some embodiments, a cell stack may be mounted in a frame as a modular unit that can be tested independently. A plurality of modular units can then be assembled together to provide an overall intended number of cell pairs in an electrochemical separation device. In some embodiments, an assembly method may generally involve placing a first modular unit on a second modular unit, placing a third modular unit on the first and second modular units, and repeating to obtain a plurality of modular units of a desired number. In some embodiments, the assembly or individual modular units may be inserted into a pressure vessel for operation. Multi-pass flow configurations may be possible with the placement of blocking membranes and/or spacers between modular units or within modular units. A modular approach may improve manufacturability in terms of time and cost savings. Modularity may also facilitate system maintenance by allowing for the diagnosis, isolation, removal and replacement of individual modular units. Individual modular units may include manifolding and flow distribution systems to facilitate an electrochemical separation process. Individual modular units may be in fluid communication with one another, as well as with central manifolding and other systems associated with an overall electrochemical separation process. One or more modules may be placed between a single pair of electrodes in accordance with one or more embodiments. In some embodiments, two or more electrochemical separation devices, which may each be generally modular and which may each have its own pair of electrodes, may be arranged in series or parallel as part of a larger electrochemical separation system.

In accordance with one or more embodiments, the efficiency of electrochemical separation systems may be improved. Current loss is one potential source of inefficiency. In some embodiments, such as those involving a cross-flow design, the potential for current leakage may be addressed. Current efficiency may be defined as the percentage of current that is effective in moving ions out of the dilute stream into the concentrate stream. Various sources of current inefficiency may exist in an electrochemical separation system. One potential source of inefficiency may involve current that bypasses the cell pairs by flowing through the dilute and concentrate inlet and outlet manifolds. Open inlet and outlet manifolds may be in direct fluid communication with flow compartments and may reduce pressure drop in each flow path. Part of the electrical current from one electrode to the other may bypass the stack of cell pairs by flowing through the open areas. The bypass current reduces current efficiency and increases energy consumption. Another potential source of inefficiency may involve ions that enter the dilute stream from the concentrate due to imperfect permselectivity of ion exchange membranes. In some embodiments, techniques associated with the sealing and potting of membranes and screens within a device may facilitate reduction of current leakage.

In one or more embodiments, a bypass path through a stack may be manipulated to promote current flow along a direct path through a cell stack so as to improve current efficiency. In some embodiments, an electrochemical separation device may be constructed and arranged such that one or more bypass paths are more tortuous than a direct path through the cell stack. In at least certain embodiments, an electrochemical separation device may be constructed and arranged such that one or more bypass paths present higher resistance than a direct path through the cell stack. In some embodiments involving a modular system, individual modular units may be configured to promote current efficiency. Modular units may be constructed and arranged to provide a current bypass path that will contribute to current efficiency. In non-limiting embodiments, a modular unit may include a manifold system and/or a flow distribution system configured to promote current efficiency. In at least some embodiments, a frame surrounding a cell stack in an electrochemical separation modular unit may be constructed and arranged to provide a predetermined current bypass path. Flow distributors associated with the frame and manifold may further reduce current bypass as described herein. In some embodiments, promoting a multi-pass flow configuration within an electrochemical separation device may facilitate reduction of current leakage. In at least some non-limiting embodiments, blocking membranes or spacers may be inserted between modular units to direct dilute and/or concentrate streams into multiple-pass flow configurations for improved current efficiency. In some embodiments, current efficiency of at least about 60% may be achieved. In other embodiments, a current efficiency of at least about 70% may be achieved. In still other embodiments, a current efficiency of at least about 80% may be achieved. In at least some embodiments, a current efficiency of at least about 85% may be achieved. According to one or more other aspects, a current efficiency of at least about 90% may be achieved. In other aspects, a current efficiency of at least about 95% may be achieved. In general, current efficiency increases as the feed water conductivity decreases. In certain instances a system performing a desalination process may exhibit a higher current efficiency when brackish water (i.e., water with a TDS of about 1000-10,000 ppm) is used as the feed water.

In accordance with one or more embodiments, a method for preparing a cell stack for an electrical purification apparatus may comprise forming compartments. A first compartment may be formed by securing ion exchange membranes to one another to provide a first spacer assembly having a first spacer disposed between the ion exchange membranes. For example, a first cation exchange membrane may be secured to a first anion exchange membrane at a first portion of a periphery of the first cation exchange membrane and the first anion exchange membrane to provide a first spacer assembly having a first spacer disposed between the first cation exchange membrane and the first anion exchange membrane.

A second compartment may be formed by securing ion exchange membranes to one another to provide a second spacer assembly having a second spacer disposed between the ion exchange membranes. For example, a second anion exchange membrane may be secured to a second cation exchange membrane at a first portion of a periphery of the second cation exchange membrane and the second anion exchange membrane to provide a second spacer assembly having a second spacer disposed between the second anion exchange membrane and the second cation exchange membrane.

A third compartment may be formed between the first compartment and the second compartment by securing the first spacer assembly to the second spacer assembly, and by positioning a spacer therebetween. For example, the first spacer assembly may be secured to the second spacer assembly at a second portion of the periphery of the first cation exchange membrane and at a portion of the periphery of the second anion exchange membrane to provide a stack assembly having a spacer disposed between the first spacer assembly and the second spacer assembly.

Each of the first compartment and the second compartment may be constructed and arranged to provide a direction of fluid flow that is different from the direction of fluid flow in the third compartment. For example, the fluid flow in the third compartment may be running in a direction of a 0° axis. The fluid flow in the first compartment may be running at 30°, and the fluid flow in the second compartment may be running at the same angle as the first compartment (30°) or at another angle, such as 120°. The method may further comprise securing the assembled cell stack within a housing.

In accordance with one or more embodiments, an electrochemical separation system may include a cross-flow design. A cross-flow design may allow for increased membrane utilization, lower pressure drop and a reduction in external leaks. Additionally, limitations on operating pressure may be reduced by a cross-flow design. In at least some embodiments, the pressure rating of a shell and endcaps may be the only substantial limitations on operating pressure. Automation of manufacturing processes may also be achieved.

In accordance with one or more embodiments, a first fluid flow path and a second fluid flow path may be selected and provided by way of the portions of the peripheries of the ion exchange membranes that are secured to one another. Using the first fluid flow path as a direction running along a 0° axis, the second fluid flow path may run in a direction of any angle greater than zero degrees and less than 360°. In certain embodiments of the disclosure, the second fluid flow path may run at a 90° angle, or perpendicular to the first fluid flow path. In other embodiments, the second fluid flow path may run at a 180° angle to the first fluid flow path. If additional ion exchange membranes are secured to the cell stack to provide additional compartments, the fluid flow paths in these additional compartments may be the same or different from the first fluid flow path and the second fluid flow path. In certain embodiments, the fluid flow path in each of the compartments alternates between a first fluid flow path and a second fluid flow path. For example, the first fluid flow path in the first compartment may be running in a direction of 0°. The second fluid flow path in the second compartment may be running in a direction of 90°, and the third fluid flow path in the third compartment may be running in a direction of 0°. In certain examples, this may be referred to as cross-flow electrical purification.

In other embodiments, the fluid flow path in each of the compartments alternates sequentially between a first fluid flow path, a second fluid flow path, and a third fluid flow path. For example, the first fluid flow path in the first compartment may be running in a direction of 0°. The second fluid flow path in the second compartment may be running at 30°, and the third fluid flow path in the third compartment may be running at 90°. The fourth fluid flow path in the fourth compartment may be running at 0°. In another embodiment, the first fluid flow path in the first compartment may be running in a direction of 0°. The second fluid flow path in the second compartment may be running at 60°, and the third fluid flow path in the third compartment may be running at 120°. The fourth fluid flow path in the fourth compartment may be running at 0°. In some embodiments, one or more flow paths may be substantially non-radial. In at least some embodiments, one or more flow paths may facilitate achieving a substantially uniform liquid flow velocity profile within the system.

In accordance with one or more embodiments, the flow within a compartment may be adjusted, redistributed, or redirected to provide greater contact of the fluid with the membrane surfaces within the compartment. The compartment may be constructed and arranged to redistribute fluid flow within the compartment. The compartment may have obstructions, projections, protrusions, flanges, or baffles that may provide a structure to redistribute the flow through the compartment, which will be discussed further below. In certain embodiments, the obstructions, projections, protrusions flanges, or baffles may be referred to as a flow redistributor. A flow redistributor may be present in one or more of the compartments of the cell stack.

Each of the compartments in the cell stack for an electrical purification apparatus may be constructed and arranged to provide a predetermined percentage of surface area or membrane utilization for fluid contact. It has been found that greater membrane utilization provides greater efficiencies in the operation of the electrical purification apparatus. Advantages of achieving greater membrane utilization may include lower energy consumption, smaller footprint of the apparatus, less passes through the apparatus, and higher quality product water. In certain embodiments, the membrane utilization that may be achieved is greater than 65%. In other embodiments, the membrane utilization that may be achieved is greater than 75%. In certain other embodiments, the membrane utilization that may be achieved may be greater than 85%. The membrane utilization may be at least in part dependent on the methods used to secure each of the membranes to one another, and the design of the spacer. In order to obtain a predetermined membrane utilization, appropriate securing techniques and components may be selected in order to achieve a reliable and secure seal that allows optimal operation of the electrical purification apparatus, without encountering leakage within the apparatus. In some embodiments, stack production processes may involve thermal bonding techniques to maximize membrane utilization, while maintaining a large surface area of membrane that may be used in the process.

In accordance with one or more embodiments, an electrical purification apparatus comprising a cell stack is provided. The electrical purification apparatus may comprise a first compartment comprising ion exchange membranes and may be constructed and arranged to provide a direct fluid flow in a first direction between the ion exchange membranes. The electrical purification apparatus may also comprise a second compartment comprising ion exchange membranes and may be constructed and arranged to provide a direct fluid flow in a second direction. Each of the first compartment and the second compartment may be constructed and arranged to provide a predetermined percentage of surface area or membrane utilization for fluid contact.

An electrical purification apparatus may comprise a cell stack. The electrical purification apparatus may comprise a first compartment comprising a first cation exchange membrane and a first anion exchange membrane, the first compartment constructed and arranged to provide a direct fluid flow in a first direction between the first cation exchange membrane and the first anion exchange membrane. The apparatus may also comprise a second compartment comprising the first anion exchange membrane and a second cation exchange membrane to provide a direct fluid flow in a second direction between the first anion exchange membrane and the second cation exchange membrane. Each of the first compartment and the second compartment may be constructed and arranged to provide a predetermined membrane utilization, for example, a fluid contact of greater than 85% of the surface area of the first cation exchange membrane, the first anion exchange membrane and the second cation exchange membrane. At least one of the first compartment and the second compartment may comprise a spacer, which may be a blocking spacer.

In accordance with one or more embodiments, the electrical purification apparatus comprising a cell stack may further comprise a housing enclosing the cell stack, with at least a portion of a periphery of the cell stack secured to the housing. A frame may be positioned between the housing and the cell stack to provide a first modular unit in the housing. A flow redistributor may be present in one or more of the compartments of the cell stack. At least one of the compartments may be constructed and arranged to provide flow reversal within the compartment.

In some embodiments of the disclosure, a cell stack for an electrical purification apparatus is provided. The cell stack may provide a plurality of alternating ion depleting and ion concentrating compartments. Each of the ion depleting compartments may have an inlet and an outlet that provides a dilute fluid flow in a first direction. Each of the ion concentrating compartments may have an inlet and an outlet that provides a concentrated fluid flow in a second direction that is different from the first direction. A spacer may be positioned in the cell stack. The spacer may provide structure to and define the compartments and, in certain examples, may assist in directing fluid flow through the compartment. The spacer may be a blocking spacer which may be constructed and arrange to redirect at least one of fluid flow and electrical current through the cell stack. As discussed, the blocking spacer may reduce or prevent electrical current inefficiencies in the electrical purification apparatus.

In some embodiments of the disclosure, an electrical purification apparatus is provided. The apparatus may comprise a cell stack comprising alternating ion diluting compartments and ion concentrating compartments. Each of the ion diluting compartments may be constructed and arranged to provide a fluid flow in a first direction. Each of the ion concentrating compartments may be constructed and arranged to provide a fluid flow in a second direction that is different from the first direction. The electrical purification apparatus may also comprise a first electrode adjacent an anion exchange membrane at a first end of the cell stack, and a second electrode adjacent a cathode exchange membrane at a second end of the cell stack. The apparatus may further comprise a blocking spacer positioned in the cell stack and constructed and arranged to redirect at least one of a dilute fluid flow and a concentrate fluid flow through the electrical purification apparatus and to prevent a direct current path between the first electrode and the second electrode. As discussed above, the blocking spacer may be constructed and arranged to reduce electrical current inefficiencies in the electrical purification apparatus.

The cell stack for the electrical purification apparatus may be enclosed in a housing with at least a portion of a periphery of the cell stack secured to the housing. A frame may be positioned between the housing and the cell stack to provide first modular unit in the housing. A second modular unit may also be secured within the housing. A blocking spacer may also be positioned between the first modular unit and the second modular unit. A flow redistributor may be present in one or more of the compartments of the cell stack. At least one of the compartments may be constructed and arranged to provide flow reversal within the compartment. A bracket assembly may be positioned between the frame and the housing to provide support to the modular unit and to secure the modular unit within the housing.

The fluid flow in the first direction may be a diluting stream and the fluid flow in the second direction may be a concentrating stream. In certain embodiments, the fluid flow in the first direction may be converted to a concentrating stream and the fluid flow in the second direction may be converted to a diluting stream with the use of polarity reversal where the applied electrical field is reversed thus reversing the stream function. Multiple spacer assemblies separated by spacers may be secured together to form a stack of cell pairs, or a membrane cell stack.

The electrical purification apparatus of the present disclosure may further comprise a housing that encloses the cell stack. At least a portion of the periphery of the cell stack may be secured to the housing. A frame or support structure may be positioned between the housing and the cell stack to provide additional support to the cell stack. The frame may also comprise inlet manifolds and outlet manifolds that allow the flow of liquid in and out of the cell stack. The frame and the cell stack together may provide an electrical purification apparatus modular unit. The electrical purification apparatus may further comprise a second modular unit secured within the housing. A spacer, for example, a blocking spacer, may be positioned between the first modular unit and the second modular unit. A first electrode may be positioned at an end of the first modular unit that is opposite an end in communication with the second modular unit. A second electrode may be positioned at an end of the second modular unit that is opposite an end in communication with the first modular unit.

A bracket assembly may be positioned between the frame and the housing of the first modular unit, the second modular unit, or both. The bracket assembly may provide support to the modular units, and provide for a secure attachment to the housing. In one embodiment of the disclosure, the electrical purification apparatus may be assembled by positioning a membrane cell stack into a housing or vessel. Endplates may be provided at each end of the cell stack. Adhesive may be applied to seal at least a portion of the periphery of the cell stack to the inside wall of the housing.

In certain embodiments of the disclosure, an electrical purification apparatus is provided that reduces or prevents inefficiencies resulting from greater electrical power consumption. The electrical purification apparatus of the present disclosure may provide for a multiple pass flow configuration to reduce or prevent current inefficiencies. The multiple pass flow configuration may reduce the bypass of current through the flow manifolds, or leakage of current, by eliminating or reducing the direct current path between the anode and the cathode of the electrical purification apparatus. In certain embodiments of the disclosure the flow within a compartment may be adjusted, redistributed, or redirected to provide greater contact of the fluid with the membrane surfaces within the compartment. The compartment may be constructed and arranged to redistribute fluid flow within the compartment. The compartment may have obstructions, projections, protrusions, flanges, or baffles that may provide a structure to redistribute the flow through the compartment. The obstructions, projections, protrusions, flanges, or baffles may be formed as part of ion exchange membranes, the spacer, or may be an additional separate structure that is provided within the compartment. In at least one embodiment, a membrane or blocking spacer may be substantially non-conductive so as to impact current flow within the system.

The spacers that may be positioned within the compartments may provide structure to and define the compartments and, in certain examples, may assist in directing fluid flow through the compartment. The spacers may be made of polymeric materials or other materials that allow for a desired structure and fluid flow within the compartments. In certain embodiments, the spacers may be constructed and arranged to redirect or redistribute fluid flow within the compartments. In some examples, the spacer may comprise a mesh-like or screen material to provide structure and allow for the desired fluid flow through the compartment. The spacer may be constructed and arranged to redirect at least one of fluid flow and electrical current to improve process efficiency. The spacer may also be constructed and arranged to create multiple fluid flow stages in an electrical purification apparatus. The spacer may comprise a solid portion to redirect fluid flow in a particular direction. The solid portion may also redirect electrical current flow in a particular direction, and prevent a direct path between an anode and a cathode in an electrical purification apparatus. In some embodiments, a spacer may promote current flow through a cell stack and generally deter current bypass with respect to the cell stack. A spacer comprising a solid portion may be referred to as a blocking spacer. The blocking spacer may be positioned within a cell stack, or may be positioned between a first cell stack, or first modular unit, and a second cell stack, or second modular unit.

In some embodiments, the plurality of ion exchange membranes secured to one another may alternate between cation exchange membranes and anion exchange membranes to provide a series of ion diluting compartments and ion concentrating compartments. The geometry of the membranes may be of any suitable geometry such that the membranes may be secured within a cell stack. In certain embodiments, a particular number of corners or vertices on the cell stack may be desired so as to suitably secure the cell stack within a housing. In certain embodiments, particular membranes may have different geometries than other membranes in the cell stack. The geometries of the membranes may be selected to assist in at least one of securing the membranes to one another, to secure spacers within the cell stack, to secure membranes within a modular unit or modular unit, to secure membranes within a support structure, to secure a group of membranes such as a cell stack to a housing, and to secure a modular unit or modular unit into a housing. The membranes, spacers, and spacer assemblies may be secured at a portion of a periphery or edge of the membranes, spacers, or spacer assemblies. A portion of a periphery may be a continuous or non-continuous length of the membrane, spacer, or spacer assembly. The portion of the periphery that is selected to secure the membrane, spacer, or spacer assembly may provide a boundary or border to direct fluid flow in a predetermined direction.

In accordance with one or more embodiments, a cell stack as discussed herein may have any desired number of ion exchange membranes, cell pairs or flow compartments. In some embodiments, an electrochemical separation system may include a single cell stack. In other embodiments, such as in modular embodiments, and electrochemical separation system may include two or more cell stacks. In some embodiments, each cell stack may be included in a separate modular unit as discussed herein. Modularity may offer design flexibility and ease of manufacturability.

In accordance with one or more embodiments, an electrochemical separation system may include a first electrode, a second electrode, a first electrochemical separation modular unit having a first cell stack defining a plurality of alternating depleting compartments and concentrating compartments supported by a first frame, the first electrochemical separation modular unit positioned between the first electrode and the second electrode, and a second electrochemical separation modular unit, in cooperation with the first electrochemical separation modular unit, having a second cell stack defining a plurality of alternating depleting compartments and concentrating compartments supported by a second frame, the second electrochemical separation modular unit positioned between the first electrochemical separation modular unit and the second electrode. The first cell stack may be surrounded by the first frame, and the second cell stack may be surrounded by the second frame. In some embodiments, the first and second electrochemical separation modular units are arranged fluidly in parallel. The first and second electrochemical separation modular units may each be of unitary construction or may themselves be constructed of sub-blocks. The first and second electrochemical separation modular units may be removable. In some embodiments, a blocking spacer may be positioned between the first and second electrochemical separation modular units. As discussed below, each of the frames may include a manifold system and/or a flow distributions system. The first and second electrochemical separation modular units may be mounted in a vessel, such as with a bracket assembly. The system may include two, three, four or more modular units depending on an intended application and various design elements. A source of water to be treated may be fluidly connected to an inlet of the vessel. The depleting compartments and concentrating compartments may each have an inlet in fluid communication with the inlet of the vessel.

In some non-limiting embodiments, at least one of the depleting compartments and concentrating compartments comprises a flow redistributor. In some embodiments, the system is configured such that a direction of flow through the depleting compartments is different than a direction of flow through the concentrating compartments. In at least one embodiment, the system may be configured such that the direction of flow through the depleting compartment is substantially perpendicular to the direction of flow through the concentrating compartments. The first and second electrochemical separation modular units may be configured to facilitate multi-pass flow within the system.

In accordance with one or more embodiments, a method of assembling a separation system may include mounting a first electrochemical separation modular unit having a first cell stack surrounded by a first frame in a vessel between a first electrode and a second electrode, and mounting a second electrochemical separation modular unit having a second cell stack surrounded by a second frame in the vessel between the first electrochemical separation modular unit and the second electrode. The method may further comprise disposing a blocking spacer between the first and second electrochemical separation modular units. The performance of each of the first and second electrochemical separation modular units may be tested prior to mounting in the vessel. A source of water to be treated may be fluidly connected to an inlet of the vessel.

In accordance with one or more embodiments, one, two or more modular units may be inserted between a first electrode and a second electrode. In some embodiments, two modular units may be substantially adjacent one another within the system. In other embodiments, a blocking spacer may be positioned between two adjacent modular units. In at least certain embodiments, a modular unit in a separation system may not have a dedicated set of electrodes. Instead, multiple modular units may be positioned between a single pair of electrodes.

In accordance with one or more embodiments, an electrochemical separation modular unit may comprise a cell stack defining a plurality of alternating depleting compartments and concentrating compartments, and a support system. The support system may be configured to maintain vertical alignment of the cell stack. The support system may be a frame in some embodiments. A frame may at least partially surround the cell stack. In other embodiments, the frame may substantially surround the cell stack. In some embodiments, a frame may include a manifold system configured to facilitate fluid flow through the cell stack. A manifold system may deliver process liquid from a central system manifold to an individual modular unit that it services. A manifold system may include an inlet manifold and an outlet manifold. A manifold system may comprise an inlet manifold in fluid communication with an inlet of each depleting compartment and with an inlet of each concentrating compartment. The manifold system may further comprise an outlet manifold in fluid communication with an outlet of each depleting compartment and with an outlet of each concentrating compartment. The manifold system may be configured to deliver treated liquid downstream via the outlet manifold. At least a portion of the manifold system may be integral to the frame or in a structure separate from the frame. In at least some embodiments, the manifold system may be constructed and arranged to prevent mixing of dilute and concentrate streams in a modular unit. The manifold system may fluidly isolate and keep separated outlets of dilute and concentrate compartments associated with a stack.

In some embodiments, a support system such as a frame may include a flow distribution system. The flow distribution system may be a part of the manifold system or a separate system. The flow distribution system may be in fluid communication with the manifold system and may be configured to promote uniform flow distribution to a cell stack. The flow distribution system may be in fluid communication with an inlet of each depleting compartment and with an inlet of each concentrating compartment. In some embodiments, at least a portion of the flow distribution system may be integral to the frame. In other embodiments, at least a portion of the flow distribution system may engage with the frame. In some embodiments, at least a portion of the flow distribution system comprises a flow distributor insert that is removably receivable by the frame. This may be for ease of manufacturability of one or more features of the flow distribution system. One or more features of the manifold and/or flow distribution system may be integrated into the frame such as via an insert structure. In some embodiments, a flow distribution system may engage with each inlet and outlet of the cell stack. In some embodiments, a frame may include an insert associated with at least one side of the cell stack. In at least some embodiments, a frame may include an insert associated with each side of the cell stack. For example, a rectangular cell stack may include four inserts. The manifold system and/or flow distribution system or component thereof may be associated with each side of a cell stack.

In accordance with one or more embodiments, a flow distribution system or an insert associated with a modular unit frame may be constructed and arranged to supply liquid to be treated to inlets of dilute and concentrate compartments of a cell stack. The flow distribution system or insert may be further constructed and arranged to receive and fluidly isolate outlet streams associated with dilute and concentrate compartments of the cell stack. The flow distribution system or insert may keep dilute and concentrate outlet streams separated. Various designs for flow distributions systems capable of having the intended functionality may be implemented in accordance with one or more embodiments. Based on the nature of the cell stack, compartment inlets and outlets may be positioned on one or more sides of the cell stack. In some embodiments, compartment inlets and outlets may be positioned on all sides of the cell stack. The design of the frame, including manifold system and flow distribution systems, may be configured such that it may receive the cell stack in any orientation. Inserts or flow distributors may also be inserted into any side of the frame and be associated with any side of the cell stack for flexibility. An insert or flow distributor may be inserted and serve to both provide fluid to be treated to the multiple compartment of the stack, as well as fluidly isolate and keep separate outlet streams of the cell stack. Further as discussed herein, the insert or flow distributor may also be constructed and arranged to improve current efficiency of the overall modular unit.

In one or more embodiments, a bypass path through a stack may be manipulated to promote current flow along a direct path through a cell stack so as to improve current efficiency. In some embodiments, an electrochemical separation device may be constructed and arranged such that one or more bypass paths are more tortuous than a direct path through the cell stack. In at least certain embodiments, an electrochemical separation device may be constructed and arranged such that one or more bypass paths present higher resistance than a direct path through the cell stack. In some embodiments involving a modular system, individual modular units may be configured to promote current efficiency. Modular units may be constructed and arranged to provide a current bypass path that will contribute to current efficiency. In non-limiting embodiments, a modular unit may include a manifold system and/or a flow distribution system configured to promote current efficiency. In at least some embodiments, a frame surrounding a cell stack in an electrochemical separation modular unit may be constructed and arranged to provide a predetermined current bypass path. In some embodiments, inserts associated with the support system, such as components of a manifold or flow distribution system, may be configured to promote current efficiency.

In accordance with one or more embodiments, at least one of the manifold system and the flow distribution system may be constructed and arranged to improve efficiency of a modular unit. The flow distribution system may comprise at least one bypass path configured to reduce current loss. The flow distribution system may include a plurality of first fluid passages oriented in a first direction. The flow distribution system may further comprise a plurality of second fluid passages oriented in a second direction and in fluid communication with the plurality of first fluid passages. In some embodiments, the first and second directions may be substantially perpendicular. The flow distribution system may comprise a flow distributor insert, wherein the frame defines a recess configured to receive the insert. The insert may define a tortuous flow path, such as a labyrinth flow path, configured to promote uniform flow distribution to the cell stack in at least some embodiments.

In some non-limiting embodiments, the insert may have a first side proximate the cell stack, and a second side opposite the first side. The insert may comprise a plurality of ports on at least one of the first and second sides. In some embodiments, at least some of the ports may be slots or grooves. Ports may be different on one side of the insert versus another side. In some embodiments, each port on the first side of the insert may be oriented substantially perpendicular to ion exchange membranes of the cell stack, and each port on the second side of the insert may be oriented substantially parallel to ion exchange membranes of the cell stack. In some embodiments, at least one port on the first side is in fluid communication with two or more compartments of the cell stack. A plurality of ports may be staggered on a side of the insert. A port may service one or multiple compartments. A cell stack may be constructed and arranged to achieve at least about 85% fluid contact with respect to surface area of ion exchange membranes defining the cell stack in some embodiments. At least one of the depleting compartments and concentrating compartments may include a blocking spacer or flow redistributor. In some embodiments, a cell stack is configured such that a direction of flow through the depleting compartments is different than a direction of flow through the concentrating compartments. In at least one embodiment, the cell stack is configured such that the direction of flow through the depleting compartment is substantially perpendicular to the direction of flow through the concentrating compartments.

In accordance with one or more embodiments, an electrochemical separation modular unit may include a flow distributor configured to promote uniform flow distribution within a cell stack. The flow distributor may be integral to the structure of a frame or manifold surrounding the cell stack. In other embodiments, at least a portion of the flow distributor may be configured to engage with the frame or manifold. The flow distributor may comprise an insert removably receivable by the frame. The modular unit can include one or more flow distributors. In some embodiments, a flow distributor may be associated with one or more sides of the cell stack. In at least some embodiments, a flow distributor may be associated with each side of the cell stack. Each side of the cell stack may have a dedicated flow distributor. A flow distributor may be configured to be removably received by the electrochemical separation device. Multiple-pass flow configuration may be possible with use of blocking membranes.

In accordance with one or more embodiments, a flow distributor for electrochemical separation may include a plurality of first passages oriented in a first direction and configured to deliver fluid to or from at least one compartment of an electrochemical separation device, and a plurality of second passages oriented in a second direction, the plurality of second passages in fluid communication with the plurality of first passages and with an inlet manifold associated with the electrochemical separation device. In some embodiments, the first direction is substantially vertical. In at least one embodiment, the second direction is substantially horizontal. The plurality of first passages may be arranged in parallel. In at least one embodiment, the plurality of second passages may be arranged in parallel. In some embodiments, at least one first passage intersects at least one second passage. A blocking member may be positioned at an intersection of a first passage and a second passage. The plurality of first passages and the plurality of second passages may be arranged to reduce current leakage within the electrochemical separation device. The plurality of first passages may be arranged with the plurality of second passages to define a labyrinth structure in some non-limiting embodiments.

In accordance with one or more embodiments, a flow distributor may have a first side configured to be disposed proximate a cell stack of the electrochemical separation device. The distributor may include a plurality of ports on the first side. The flow distributor may have a second side arranged opposite the first side and may have a plurality of ports on the second side. The plurality of ports on the first and second sides may comprise slots or grooves in some embodiments. In at least one embodiment, the ports may be different on the first and second side. Each port on the first side may be oriented substantially perpendicular to compartments of the electrochemical separation device in some non-limiting embodiments. Each port on the second side may be oriented substantially parallel to compartments of the electrochemical separation device. The plurality of ports on the second side may be configured to distribute fluid flow to the plurality of ports on the first side. In some embodiments, at least one port on the first side may be in fluid communication with two or more compartments of electrochemical separation device. In some embodiments, the plurality of ports on the first side or the second side may be staggered. The flow distributor may be constructed and arranged to promote current flow to operating surfaces of the electrochemical separation device. A port may be associated with the flow distributor. The port may have various positions with respect to the flow distributor. The flow distributor may comprise a port substantially centered with respect to the flow distributor to promote uniform flow distribution from the inlet manifold to the compartments of the electrochemical separation device. In other embodiments, a port may be offset relative to the flow distributor.

Figure 2:
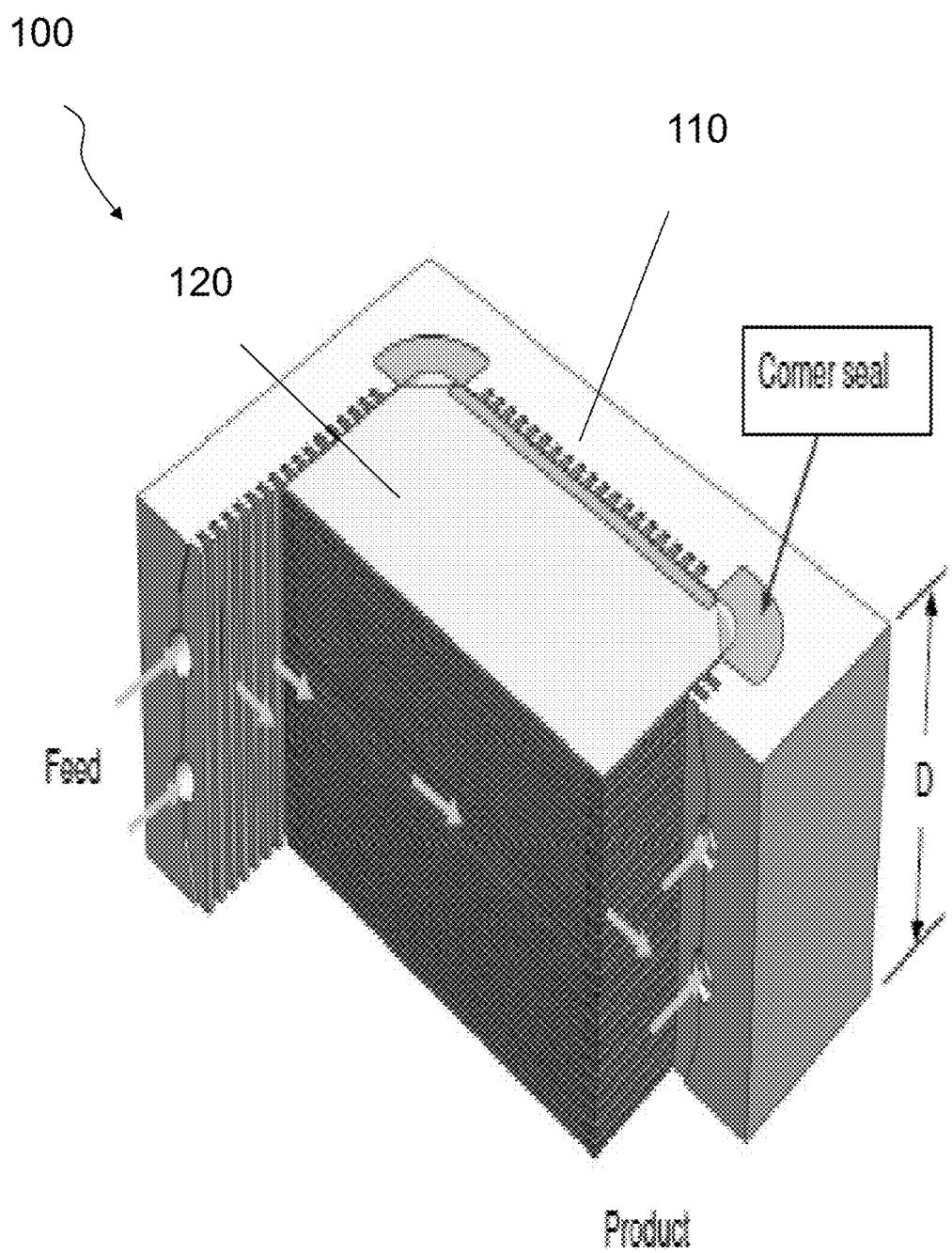
FIG. 2 is a schematic illustration of Section A-A in FIG. 1 in accordance with one or more embodiments.
Figure 3:
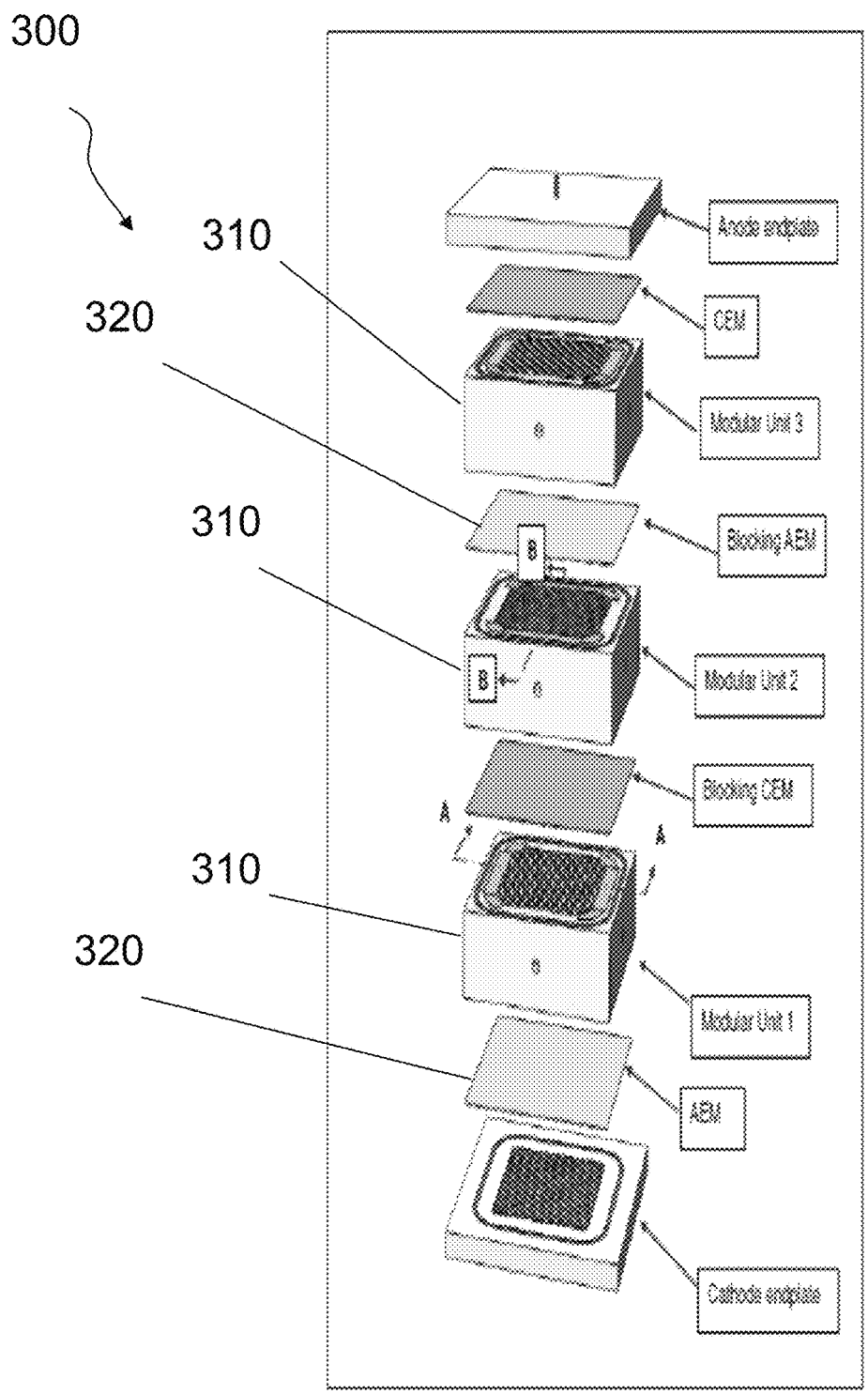
FIG. 3 is a schematic illustration of an exploded view of an ED device in accordance with one or more embodiments.
Figure 4:
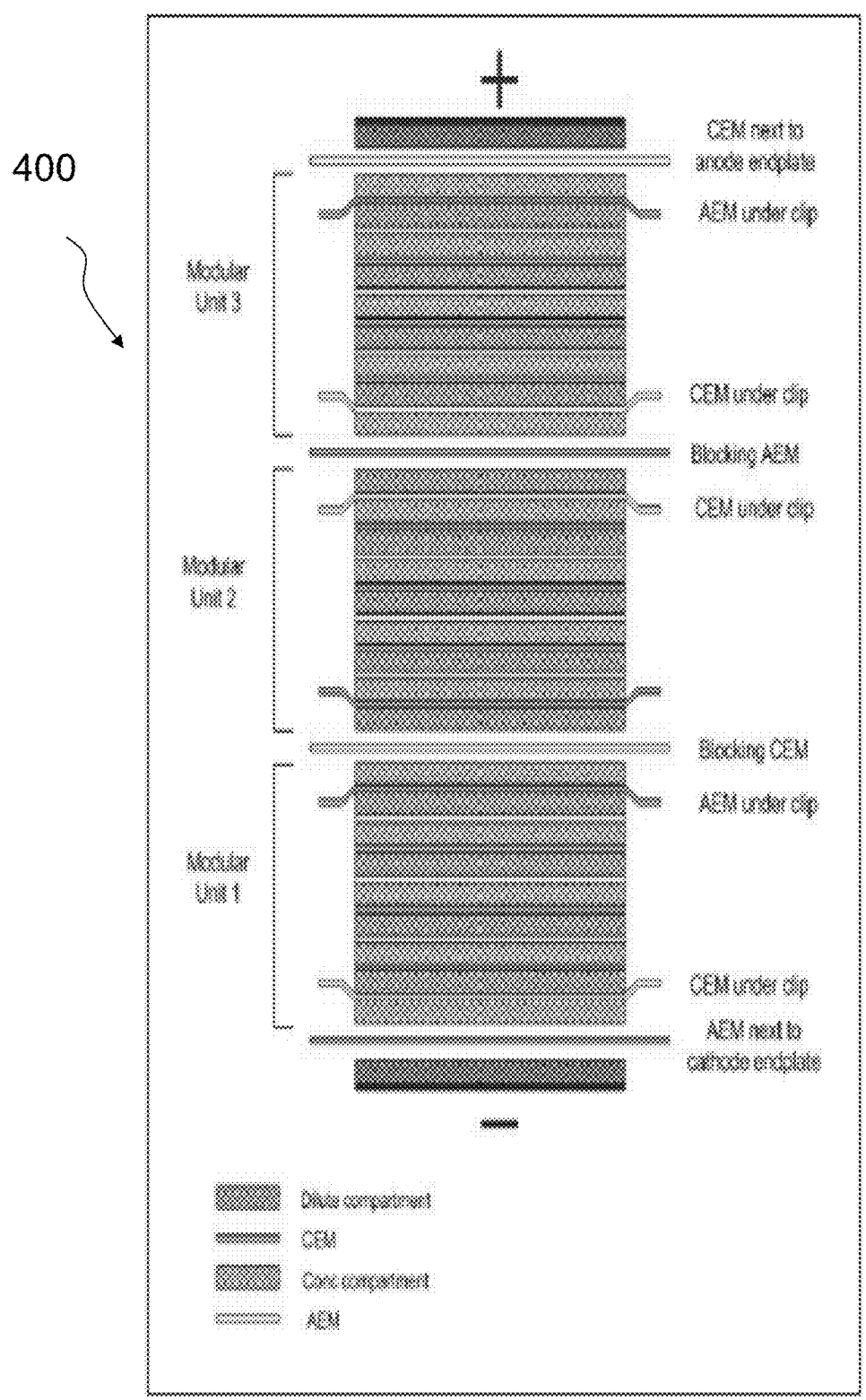
FIG. 4 is a schematic illustration of an arrangement of membranes and cells in an ED device in accordance with one or more embodiments.
Figure 5:
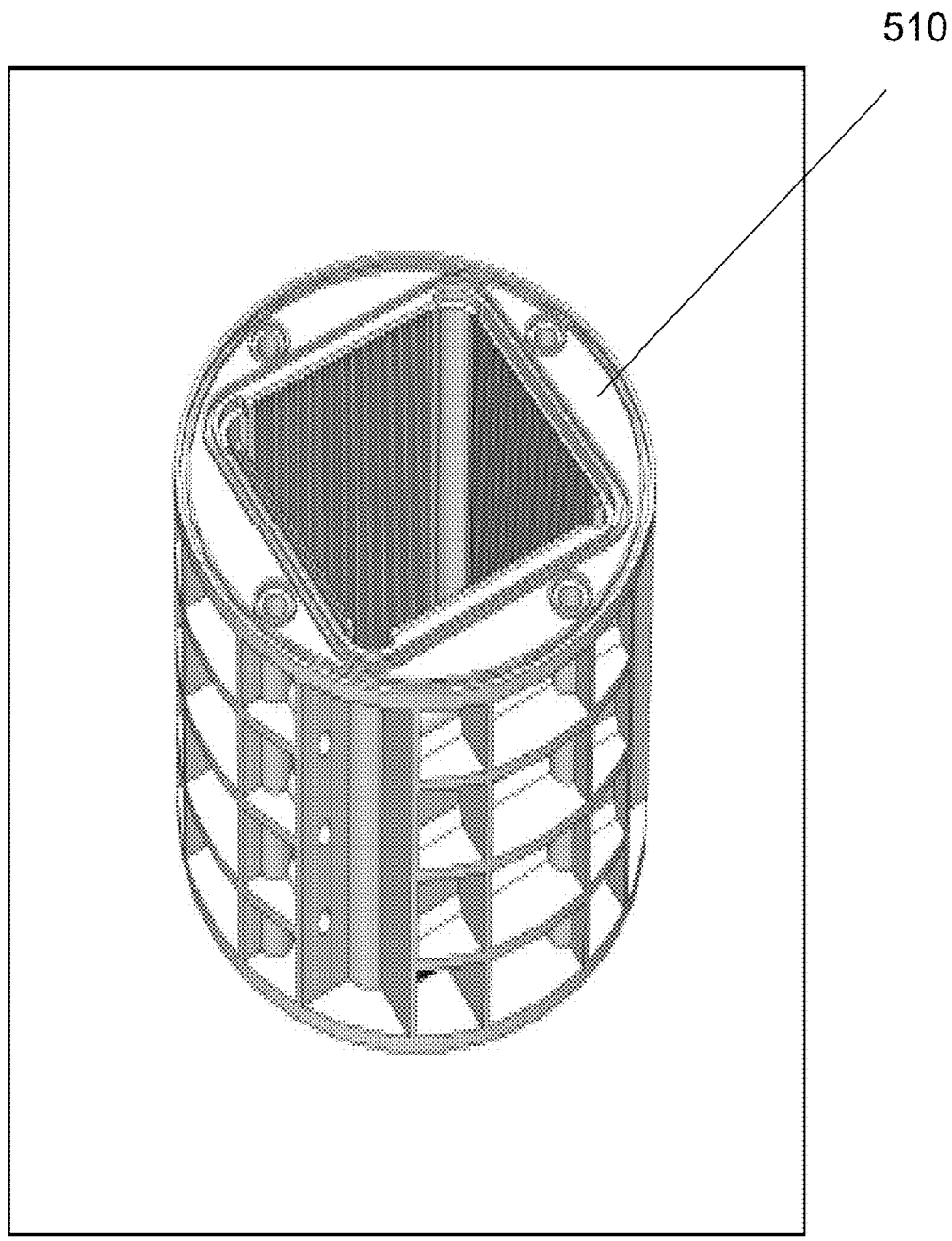
FIG. 5 is a schematic illustration of a frame with cylindrical outer shape in accordance with one or more embodiments.
Figure 6:
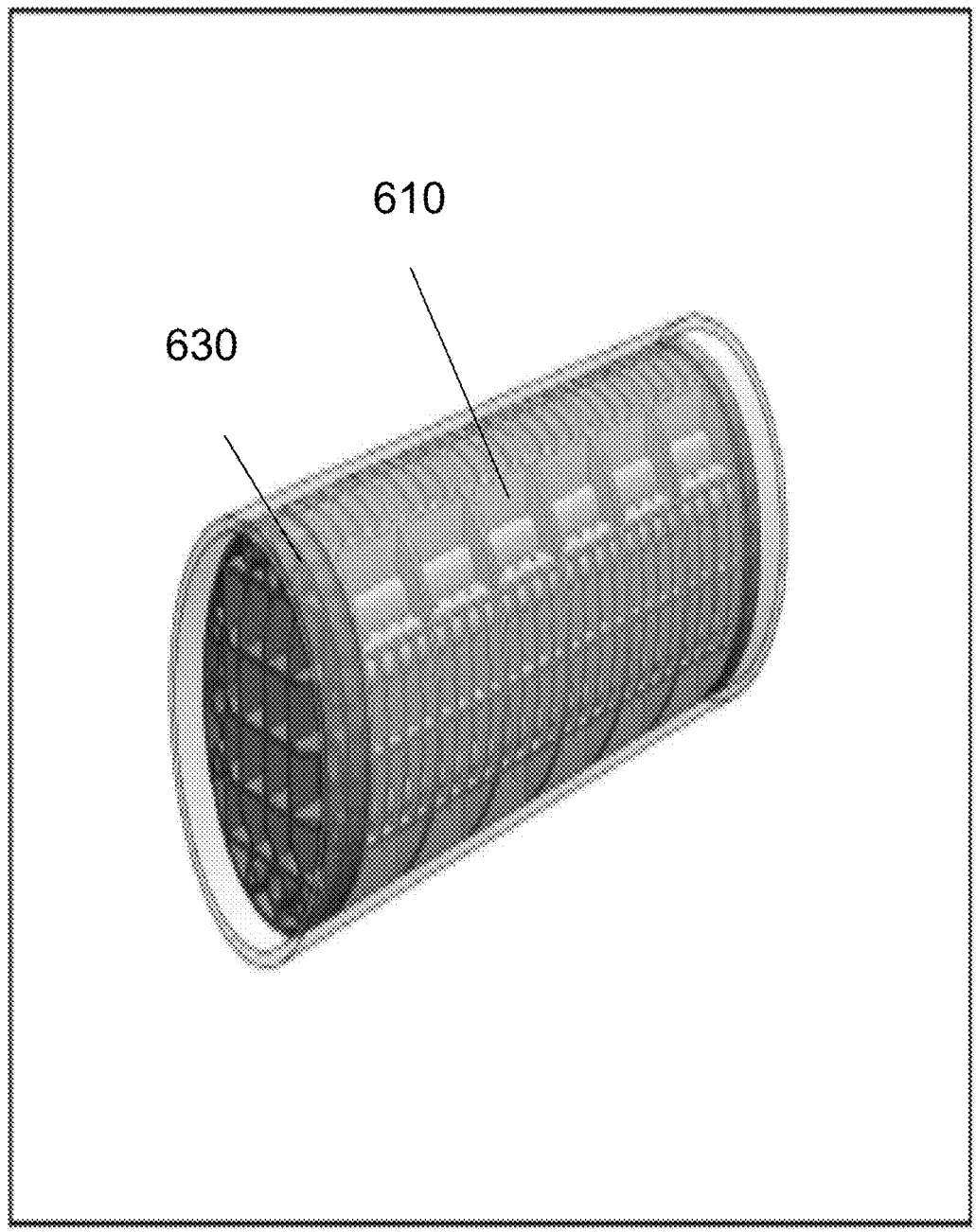
FIG. 6 is a schematic illustration of an ED device in a cylindrical vessel with molded endplates in accordance with one or more embodiments.

As discussed, an electrochemical separation system may be substantially modular. A module is schematically illustrated in FIG. 1. Module 100 may include frame 110 and cell stack 120. FIG. 2 presents a cross-sectional view of module 100 illustrating manifolding in frame 110 and fluid flow through cell stack 120. Multiple modules may be fluidly connected to provide a desired overall number of cell pairs or compartments between a pair of electrodes. FIG. 3 presents an exploded view of a modular electrochemical separation system 300. Modules 310 are stacked with blocking spacers 320 inserted therebetween. The plurality of modules 310 are positioned between a pair of electrodes. FIG. 4 presents a schematic of a modular electrochemical separation system 400 illustrating alternating concentrating and diluting compartments. Module frames may have any geometry. FIG. 5 illustrates a substantially round module frame 510. The geometry may correspond to the shape of a vessel configured to house the modules. FIG. 6, for example, illustrates cylindrical vessel 630 configured to house multiple modules 610.

Modularity may facilitate manufacture, installation, testing and maintenance. Each module may be fluidly connected to inlet and outlet system manifolding. Each module may include a cell stack mounted within a frame. The frame may include manifolding to interface with overall system manifolding. The frame manifolding may include a flow distributor insert. The inserts may be separately manufactured and received by the frame to provide enhanced design features to the frame and module manifolding which would otherwise be difficult to provide. The flow distributor insert may define a tortuous flow path to promote current efficiency. In at least some embodiments, the tortuous flow path defined by the flow distributor may be a labyrinth flow path with multiple turns.

In accordance with one or more embodiments, flow distribution manifolds may reduce current bypass in cross-flow electrochemical separation devices. In some embodiments, tooling and part cost of injection molded flow distribution manifolds may be reduced by assembling inserts from separately molded sections. The separate sections may be cored out to reduce mass and cycle time. The sections may be configured such that any resulting internal void spaces do not fill with stagnant water, which can lead to biogrowth. In at least some embodiments, a labyrinth flow path is provided to reduce current bypass.

Figure 7:
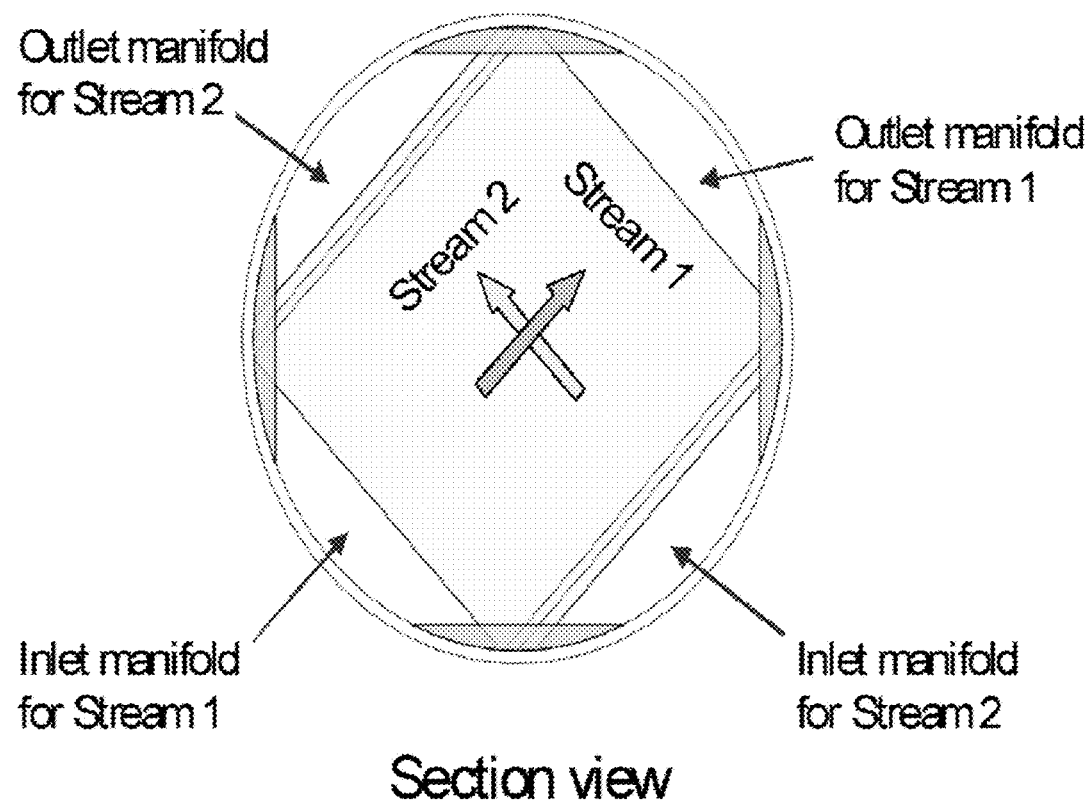
FIG. 7 is a schematic illustration of flow through a stack of cell pairs in accordance with one or more embodiments.
Figure 8:
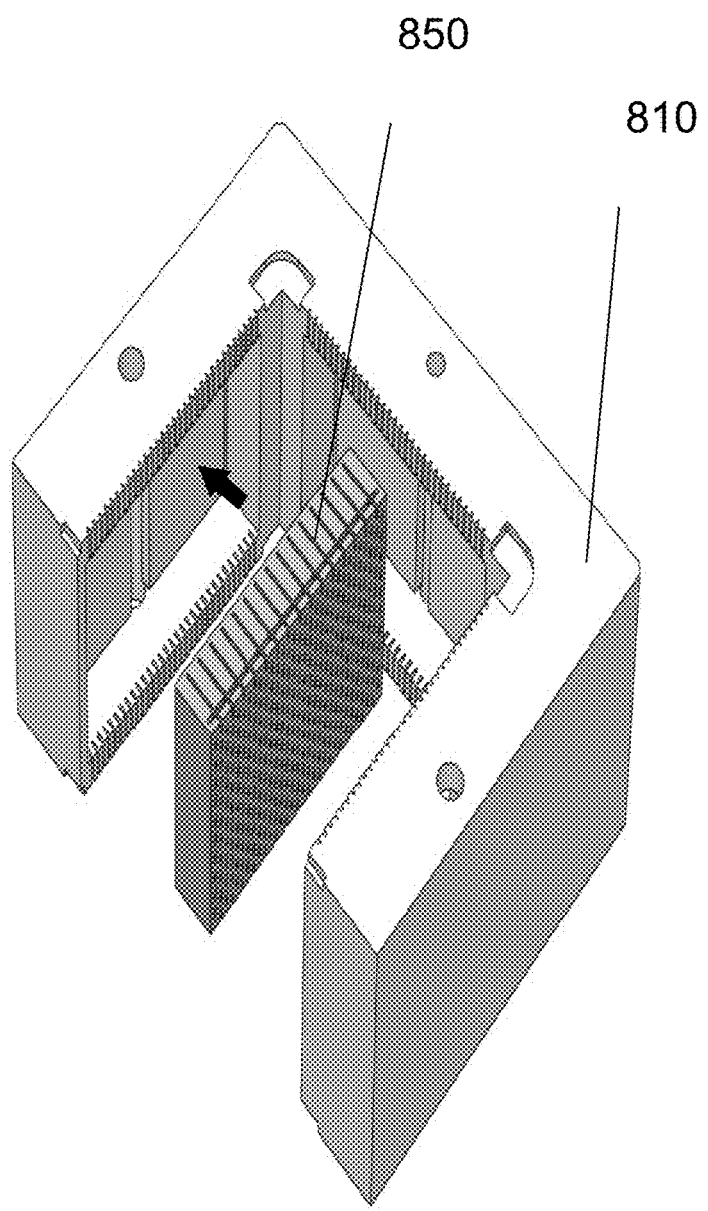
FIG. 8 is a schematic illustration of a frame with an insert to be installed in accordance with one or more embodiments.
Figure 9:
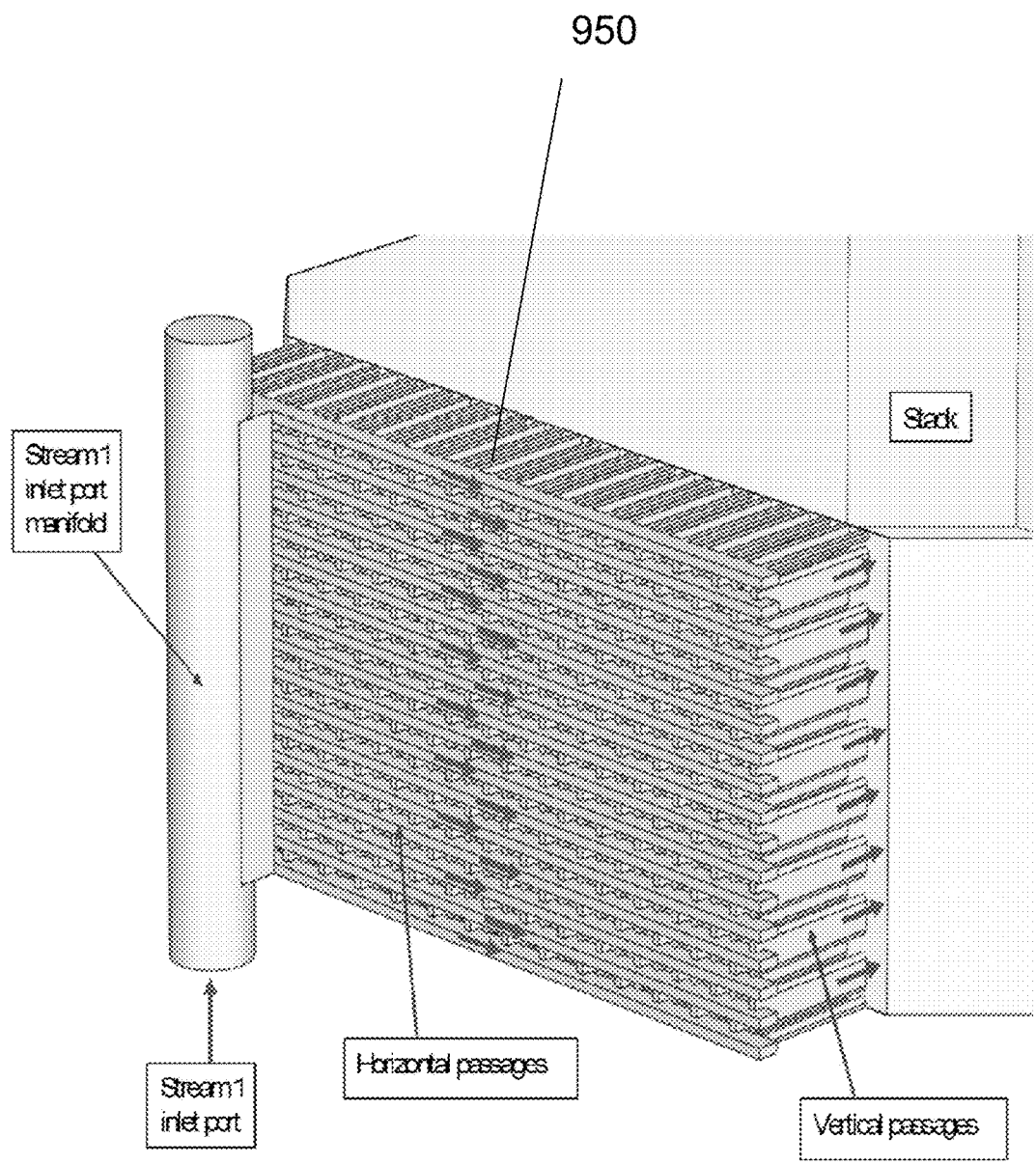
FIGS. 9 and 10 present schematic illustrations of flow through a modular frame manifold in accordance with one or more embodiments.
Figure 10:
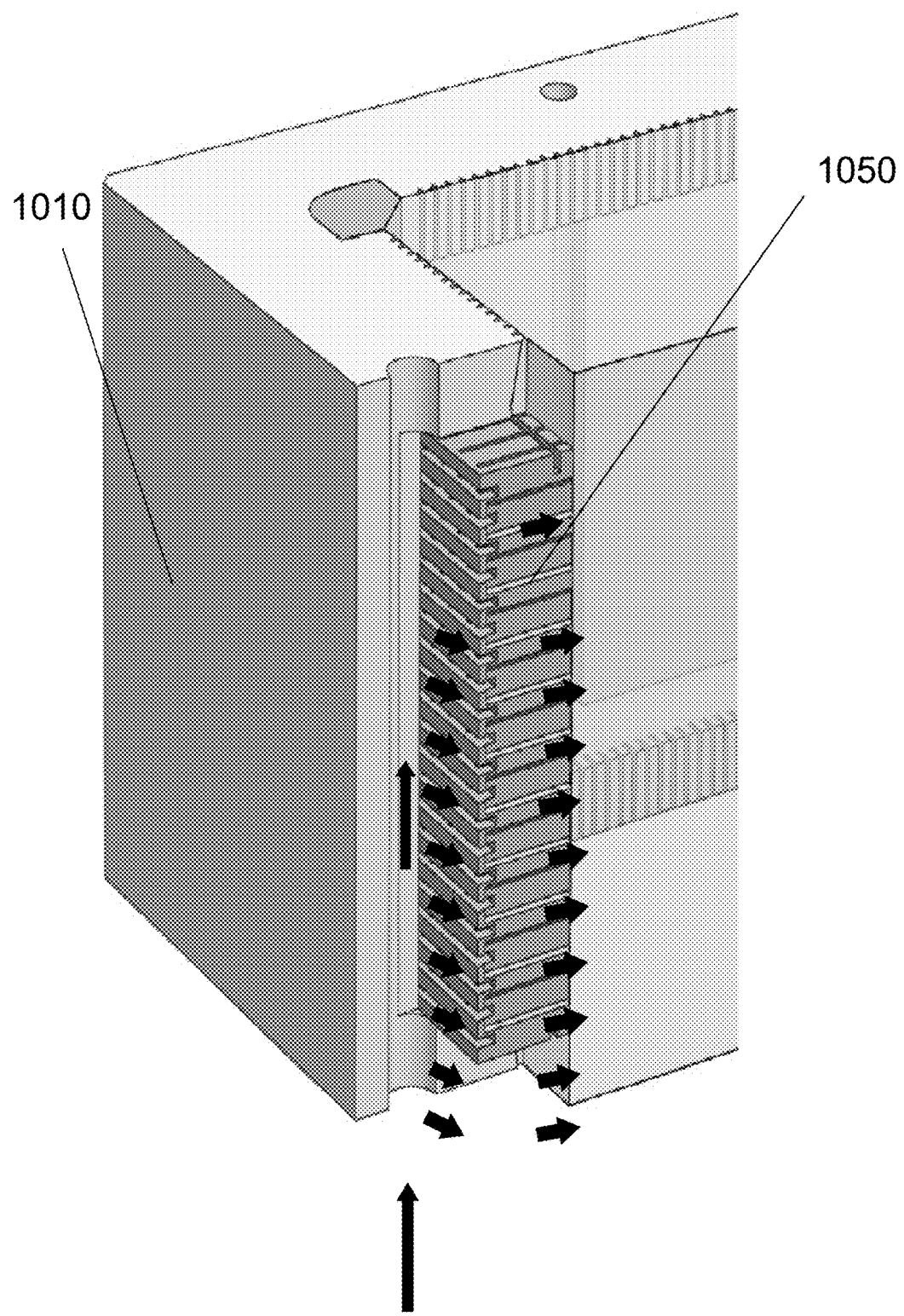

In cross-flow ED and EDI, devices the diluting and concentrating streams flow in directions perpendicular to each other and the flow distribution manifolds may facilitate this cross-flow pattern as illustrated in FIG. 7. Potential applications include desalination of seawater, brackish water and brines from oil and gas production. ED and EDI systems applied to desalination of highly conductive solutions such as seawater, have the potential disadvantage of low current efficiency, defined as the percentage of current that is effective in moving ions out of the dilute stream into the concentrate stream. Current, for example, can bypass the cell pairs by flowing through open inlet and outlet manifolds in direct fluid communication with the dilute and concentrate compartments. In some embodiments, a stack of cell pairs may be assembled in a modular frame with inlet and outlet manifolds that reduce the bypass current. Flow distributors 850 as illustrated in FIG. 8 and discussed herein may be received by the modular frame and cooperate with the manifolding to reduce bypass current. In general, the flow distributors may have a first set of ports in direct communication with the cells in a stack and a second set of ports that connect system manifolding to the first set of ports. As illustrated in FIG. 9, fluid may flow from central manifolding to the cell stack via a flow distributor 950. Flow from the inlet port may be distributed to a number of horizontal passages that are arranged in parallel. Each horizontal passage in turn may distribute a volume of flow to a number of flow compartments in the cell stack via vertical passages. At the outlet of the flow compartments, the reverse sequence of passages (vertical passages→horizontal passages→outlet port) allows the flow to exit the sub-block. The flow distributor 950 may define a tortuous flow path involving horizontal and vertical passages to improve current efficiency. These flow distributors, which may also be referred to as inserts, may be placed in recesses within the frames. The side of the flow distributors in close contact with the cell stacks may have vertical ports in some non-limiting embodiments. FIG. 10 presents a schematic of flow distributor 1050 received by module frame 1010 in which horizontal flow passages lead to vertical flow passages to the cell stack. As shown, a stream may enter the bottom of the frame through an inlet port. The liquid in the stream may then flow through the series of horizontal and vertical passages into the cell stack. The sectional view shows how each horizontal passage is in fluid communication with a number of vertical passages in parallel and how the horizontal passages are in fluid communication with each other via the module frame and port manifold. For simplicity, the stack of cell pairs is represented by a transparent box. The flow distributor 1050 may also have additional slots on the top and bottom that are in fluid communication with slots in the frame that supply flow to the top and bottom ends of the stack.

Figure 11:
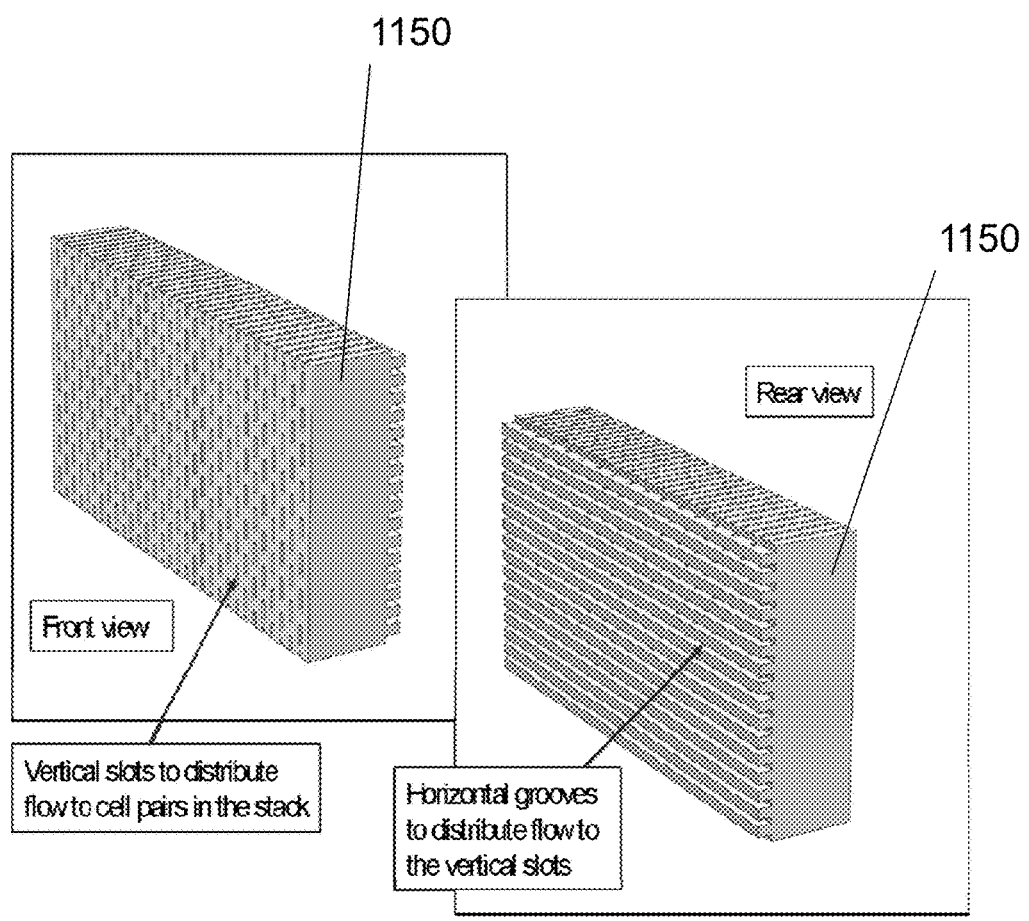
FIG. 11 presents a schematic of a flow distributor configured to fit into a square module frame in accordance with one or more embodiments.
Figure 12:
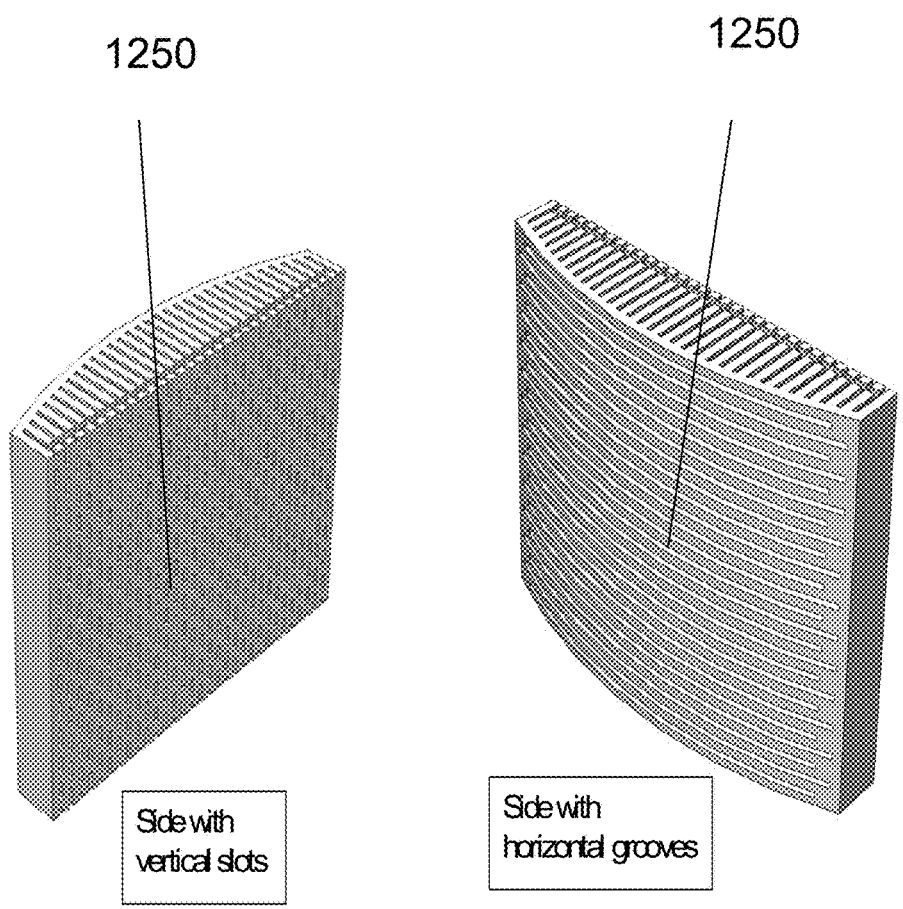
FIG. 12 presents a schematic of a flow distributor configured to fit into a module frame with circular periphery in accordance with one or more embodiments.

In accordance with one or more embodiments, the flow distributor may have a geometry that corresponds to the module frame. FIG. 11 illustrates a flow distributor 1150 with substantially rectangular geometry while FIG. 12 illustrates a flow distributor 1250 with a partially round geometry. Both figures show the vertical slots on one face of the flow distributor and the horizontal grooves on the other to form respectively the vertical and horizontal flow passages.

In some embodiments, flow distributors may be fabricated by machining solid plastic materials, for example, or by rapid prototyping methods such as stereolithography (SLA). For high volume manufacturing at low cost, injection molding is a preferred method. In some embodiments, flow distributor design may generally be conducive to injection molding. Select design parameters to facilitate manufacture include the length of the vertical flow passages relative to their width, and thickness of the material between flow passages. In accordance with certain embodiments, the slots may have a width in a range of from about 0.5 mm to about 5 mm According to at least one embodiment, the slots may have a width in a range of from about 1 mm to about 3 mm (0.04" to 0.12"). In some embodiments, the slots may have a height in a range of from about 1 mm to about 15 mm. In various embodiments, the slots may have a height in a range of from about 4 mm to about 12 mm (0.16" to 0.63"). According to some embodiments, the slots may have a length of from about 5 mm to about 80 mm. In certain embodiments, the slots may have a length of from about 15 mm to about 60 mm (0.59" to 2.4"). In various embodiments, the material between the slots may have a thickness in a range of from about 1 mm to about 10 mm According to some embodiments, the thickness of the wall material may be from about 2 mm to about 6 mm (0.08" to 0.24"). In some embodiments, flow distributors may be manufactured at relative low cost with high dimensional precision while reducing current bypass in cross-flow devices.

In at least some embodiments, ports on the face (front) of the flow distributor adjacent to the stack of cell pairs supply fluid to the inlets of the flow compartments or collect fluid from the outlets of the flow compartments. In a cross-flow device, one set of manifolds (including related flow distributors) is in fluid communication with the diluting compartments while another set is in fluid communication with the concentrating compartments with flow in a perpendicular direction. In some embodiments, the ports may be slots. The slots may be oriented vertically or at an angle so that they are in fluid communication with a number of cell pairs. The slots may also be staggered so that no cell pair is blocked from fluid flow.

In at least some embodiments, horizontal channels on the face away from the cell stack (back) connect the ports on the front to an inlet or outlet manifold. Each channel may be in fluid communication with only a horizontal row of slots. The walls between the channels may prevent current from bypassing the stack by flowing directly from the slots at one level to slots at another level, either above or below. The horizontal slots are fluidly connected at the inlet or outlet ports. The path length for bypass current to flow from a compartment at a first level to another at a second level via: slot at first level⇒horizontal channel at first level⇒inlet or outlet port⇒horizontal channel at a second level⇒slots at a second level must generally be long enough so that the electrical resistance through the path is higher than the resistance from the first level to the second level through the stack. In the examples shown in FIGS. 1 and 2, this may be achieved by specific arrangements of vertical slots and horizontal channels which may in some embodiments form a labyrinth flow path. In some embodiments, the fluid passages in the flow distributor include parallel passages defined by the slots and connected by the horizontal channels.

In some embodiments, a thickness of the walls that define the slots and channels are as uniformly thin as possible to reduce the total mass of the flow distributor and ensure uniform but rapid cooling throughout after the molten plastic is injected into the mold cavity. In injection molding terminology, this design step is referred to as "coring out" the part to reduce material cost and cycle time. The "coring" step must not result in internal void spaces that can be filled with stagnant fluid, which can lead to biogrowth.

In accordance with one or more embodiments, a flow distributor may be formed from separate molded parts configured to be assembled together. Depending on the method of manufacture, internal void volumes may need to be sealed. Internal spaces not in the flow paths must be sealed to prevent leakage of fluid into the spaces and accumulation of stagnant fluid. In some preferred embodiments, there is generally flow through all internal spaces.

Possible methods of joining the parts include adhesive bonding and ultrasonic welding. In some preferred embodiments, parts may be configured to mate together without need for bonding or welding, such as by snapping or tightly fitting together. In some embodiments, a labyrinth flow pattern may be formed by the interaction or mating of adjacent parts upon assembly. The slots in each part have length to width ratio small enough that blades necessary in the mold to form the slots can be mechanically strong enough to withstand the stresses during the molding process.

Figure 13:
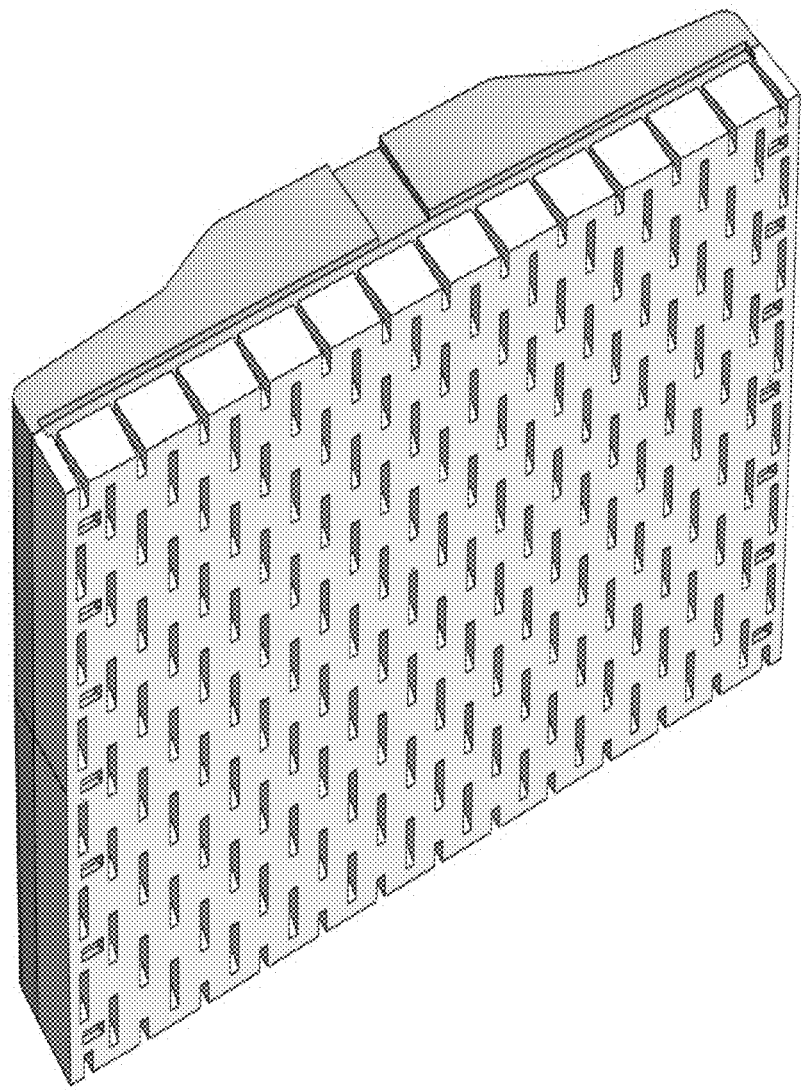
FIG. 13 presents a schematic of a flow distributor with internal labyrinth paths, assembled from three parts in accordance with one or more embodiments.
Figure 13A:
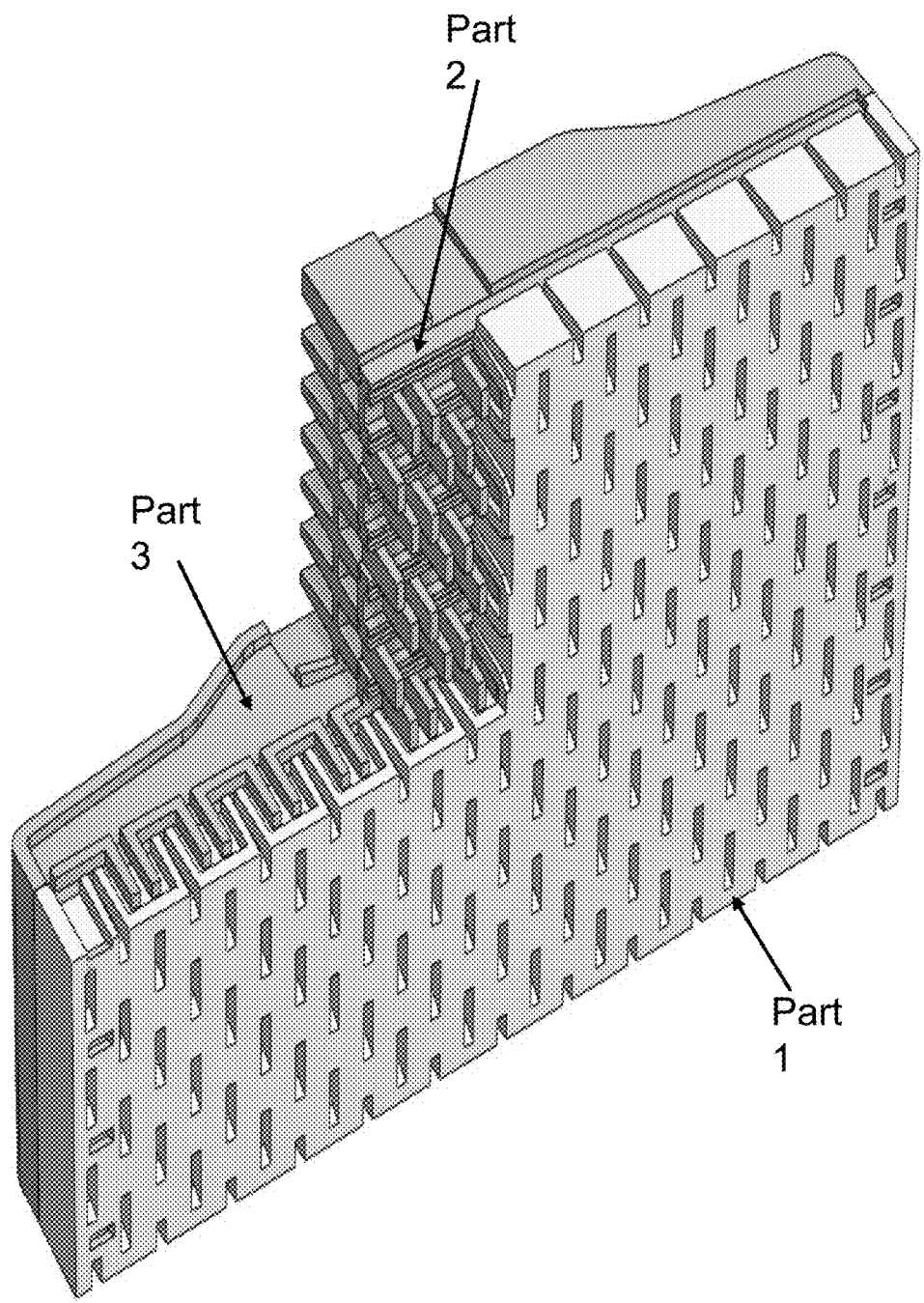
FIG. 13A presents an alternative view of the flow distributor shown in FIG. 13 in accordance with one or more embodiments.
Figure 13B:
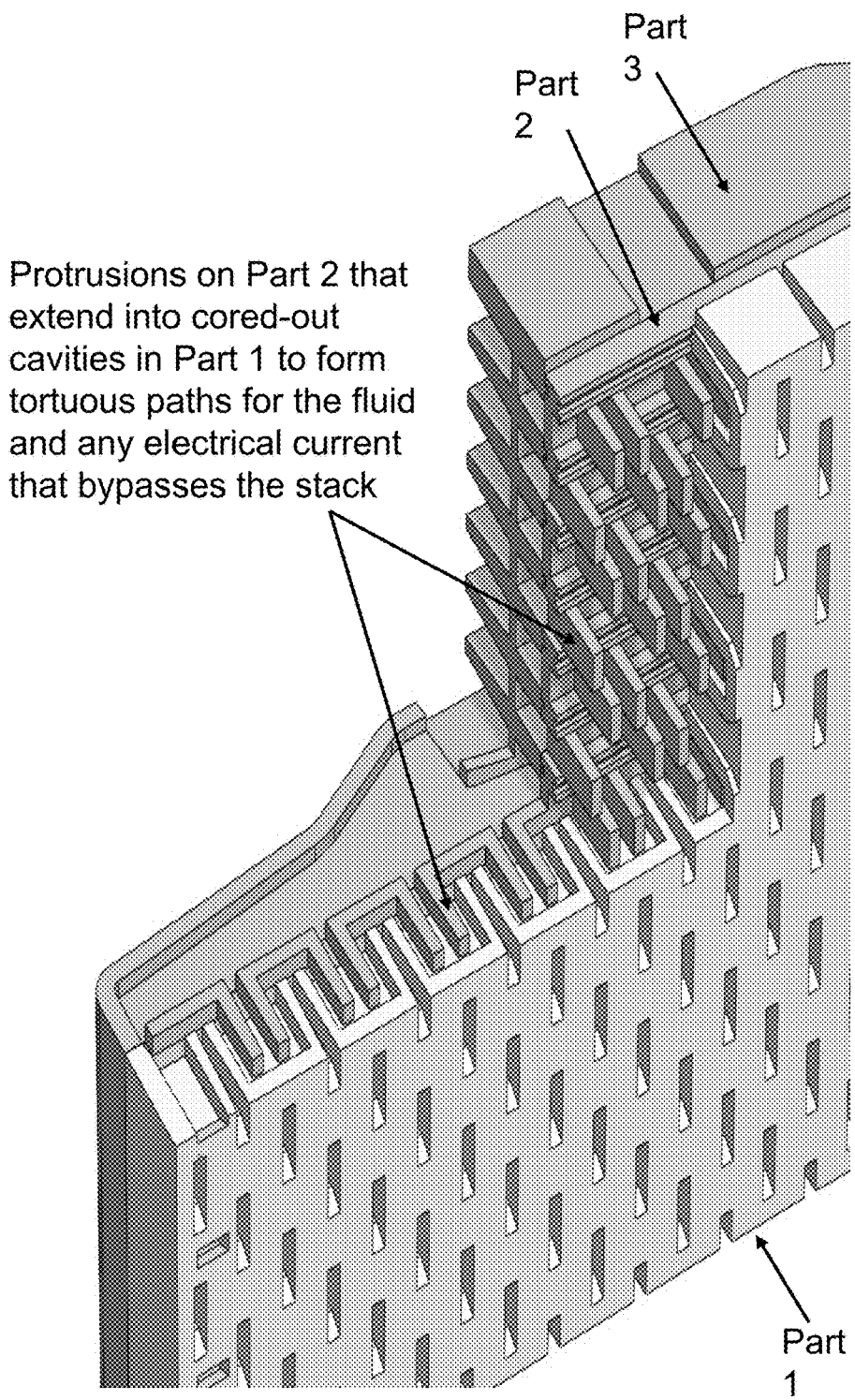
FIG. 13B presents a close-up schematic of the view shown in FIG. 13A in accordance with one or more embodiments.
Figure 14:
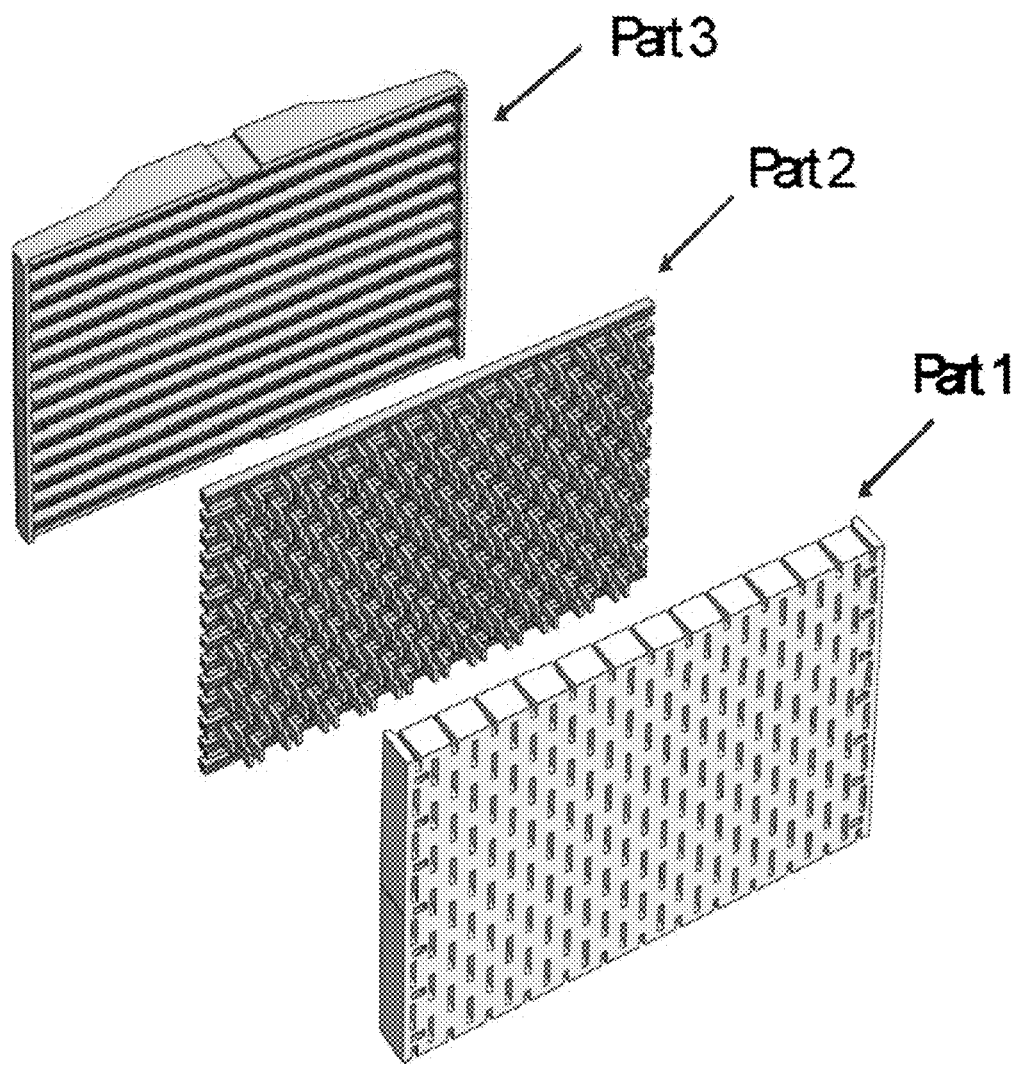
FIG. 14 presents a front exploded view of a flow distributor with internal labyrinth paths in accordance with one or more embodiments.
Figure 14A:
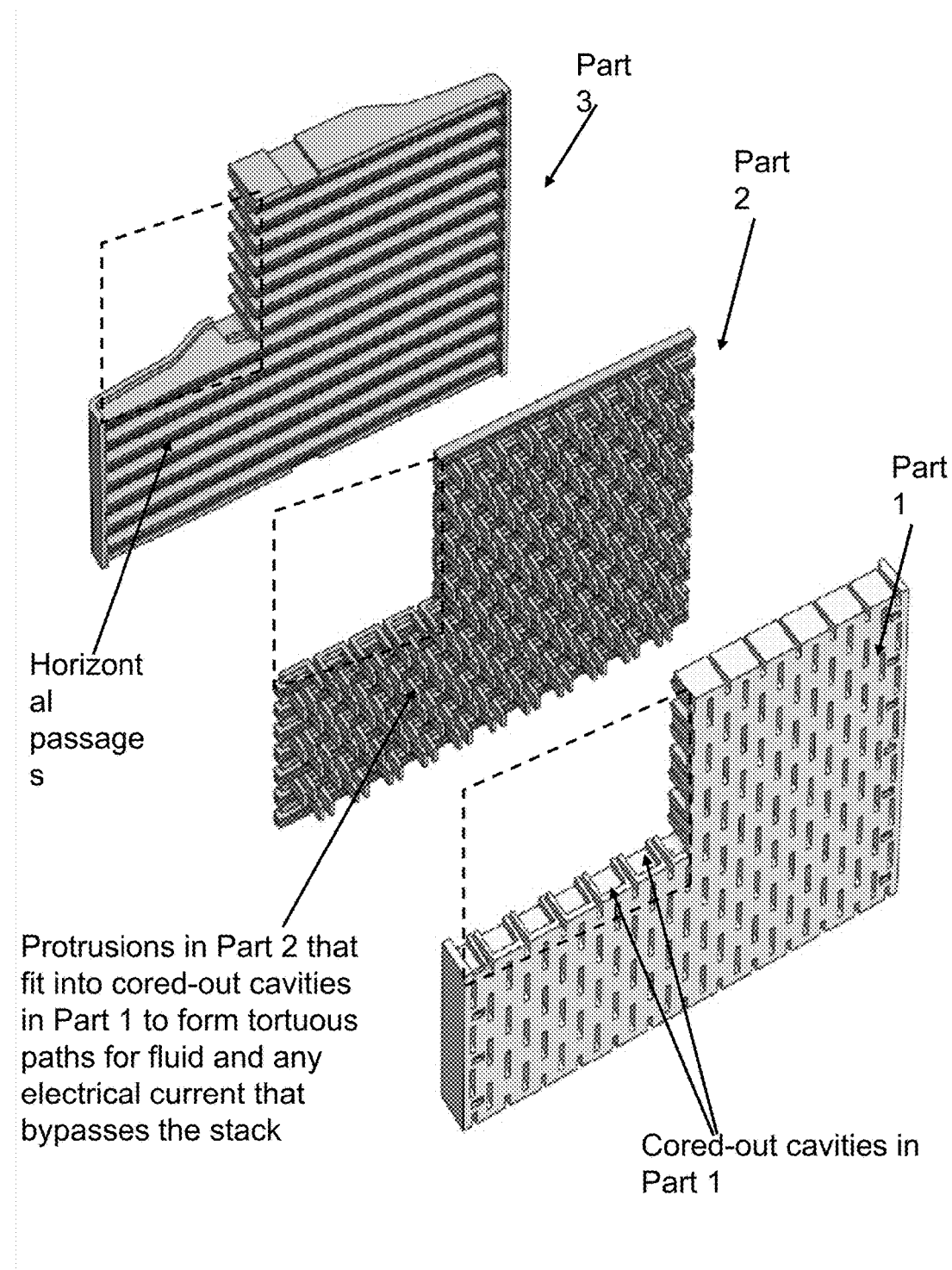
FIG. 14A presents an alternative view of the flow distributor shown in FIG. 14 in accordance with one or more embodiments.
Figure 15:
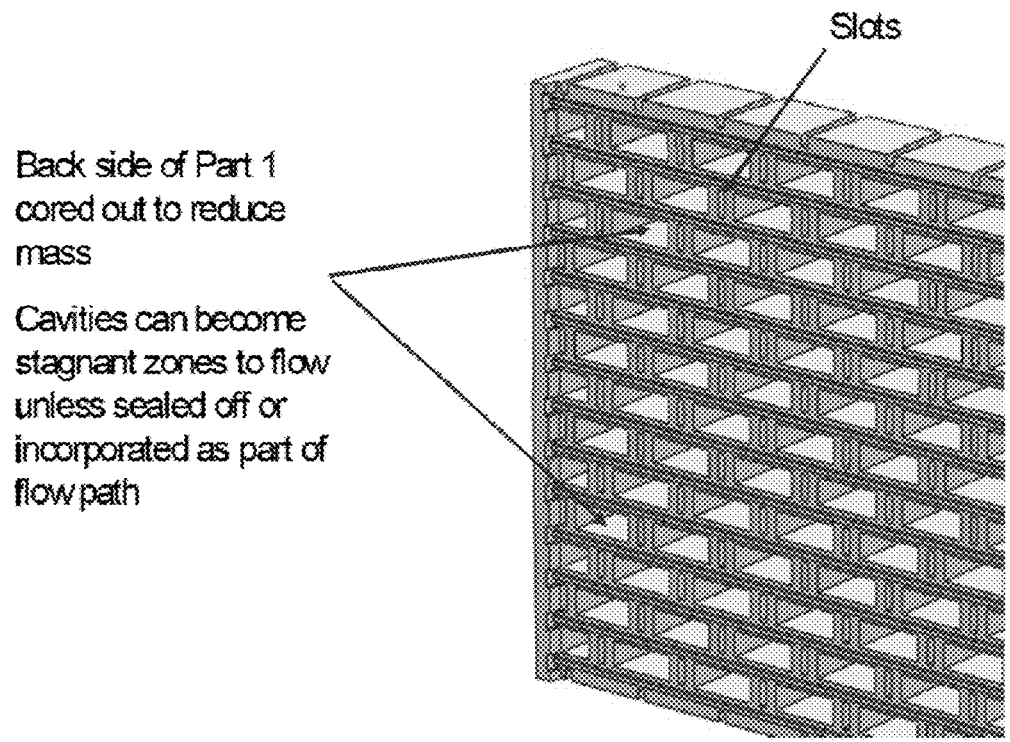
FIG. 15 presents a rear view of Part 1 of FIG. 14 in accordance with one or more embodiments.

FIG. 13 illustrates a flow distributor with an internal labyrinth flow path. FIGS. 13A and 13B illustrates a cross-section of the flow distributor depicted in FIG. 13. As shown, the flow distributor may be constructed to include cored-out cavities and protrusions that create a tortuous flow path for both the fluid and bypassing electrical current. The flow distributor may be assembled from multiple components, such as the three components as shown in FIG. 13A (assembled) and FIGS. 14 and 14A (exploded view). As illustrated in FIG. 14A, various components may be configured to mate with one another to define a tortuous flow path. A multi-part construction may facilitate manufacture. Various potential geometries are within the scope of this disclosure. Protrusions in one part of the module may be configured to fit into corresponding cored-out cavities in an adjacent part of the module in some non-limiting embodiments. FIG. 15 shows the back side of Part 1. Between the slots there would be thick sections of material if they were not cored out. Once cored out, however, the cavities must be sealed or incorporated into the flow paths. The latter is accomplished in this design by using protrusions or baffles in Part 2 to creating labyrinth flow paths. Horizontal slots in Part 3 connect the labyrinth paths to the inlet or outlet port.

In accordance with one or more embodiments, a flow distributor for electrochemical separation may include a plurality of vertical passages configured to transport fluid to or from at least one compartment of an electrochemical separation device, a plurality of horizontal passages in fluid communication with the plurality of vertical passages and in fluid communication with a fluid manifold associated with the electrochemical separation device, and a plurality of baffles arranged at junctions between the plurality of vertical passages and the plurality of horizontal passages to define a labyrinth flow path between the fluid manifold and the electrochemical separation device. The plurality of vertical passages may be arranged in parallel, and the plurality of horizontal passages may be arranged in parallel in some non-limiting embodiments. The flow distributor may be configured such that fluid travels around the baffles along the labyrinth flow path.

In accordance with one or more embodiments, the flow distributor may have a first side configured to be disposed proximate a cell stack of the electrochemical separation device, wherein the flow distributor comprises a plurality of ports on the first side, and may further have a second side arranged opposite the first side, wherein the flow distributor comprises a plurality of ports on the second side. The ports on the first side may be fluidly connected to the ports on the second side via the labyrinth flow path.

The plurality of ports on the first and second sides may comprise slots. Each port on the first side may be oriented substantially perpendicularly to compartments of the electrochemical separation device, and each port on the second side may be oriented substantially parallel to compartments of the electrochemical separation device. At least one port on the first side of the flow distributor may be in fluid communication with two or more compartments of the electrochemical separation device.

In accordance with one or more embodiments, a modular flow distributor for electrochemical separation may include a first component defining a plurality of vertical passages configured to transport fluid to or from at least one compartment of an electrochemical separation device, and a second component defining a plurality of horizontal passages and comprising a plurality of baffles, the second component configured to mate with the first component such that the baffles are arranged with the plurality of vertical passages and the plurality of horizontal passages to form a labyrinth flow path between the electrochemical separation device and a fluid manifold. The modular flow distributor may further include a third component configured to connect the second component to the fluid manifold.

The plurality of ports on the first side of the flow distributor may be arranged in a definite pattern. In some embodiments, the plurality of ports on the first side of the flow distributor may be angled relative to a vertical axis.

The embodiments disclosed herein with respect to the flow distributor and modularity thereof are merely presented for purposes of example. Other configurations and geometries which may provide the desired tortuosity are intended to fall within the scope of this disclosure.

Figure 16:
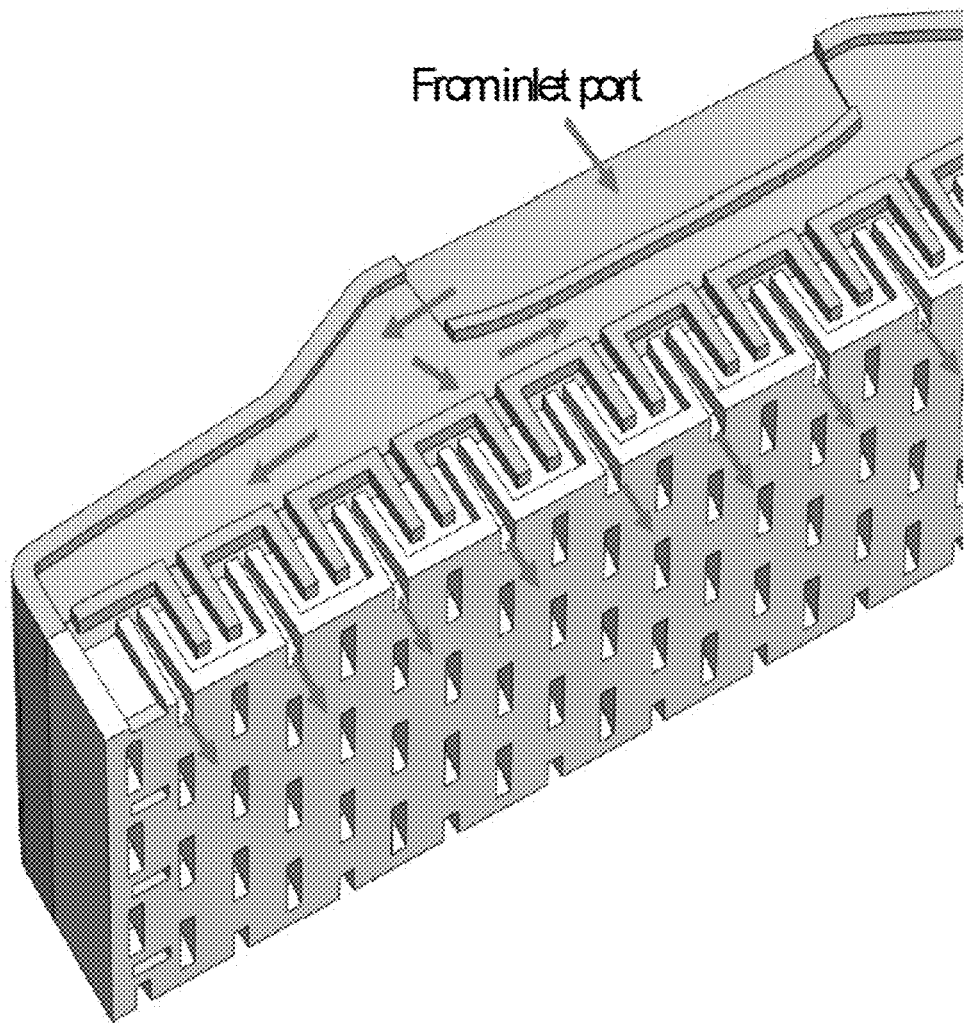
FIGS. 16, 17 and 17A present schematics of a labyrinth flow path in accordance with one or more embodiments.
Figure 17:
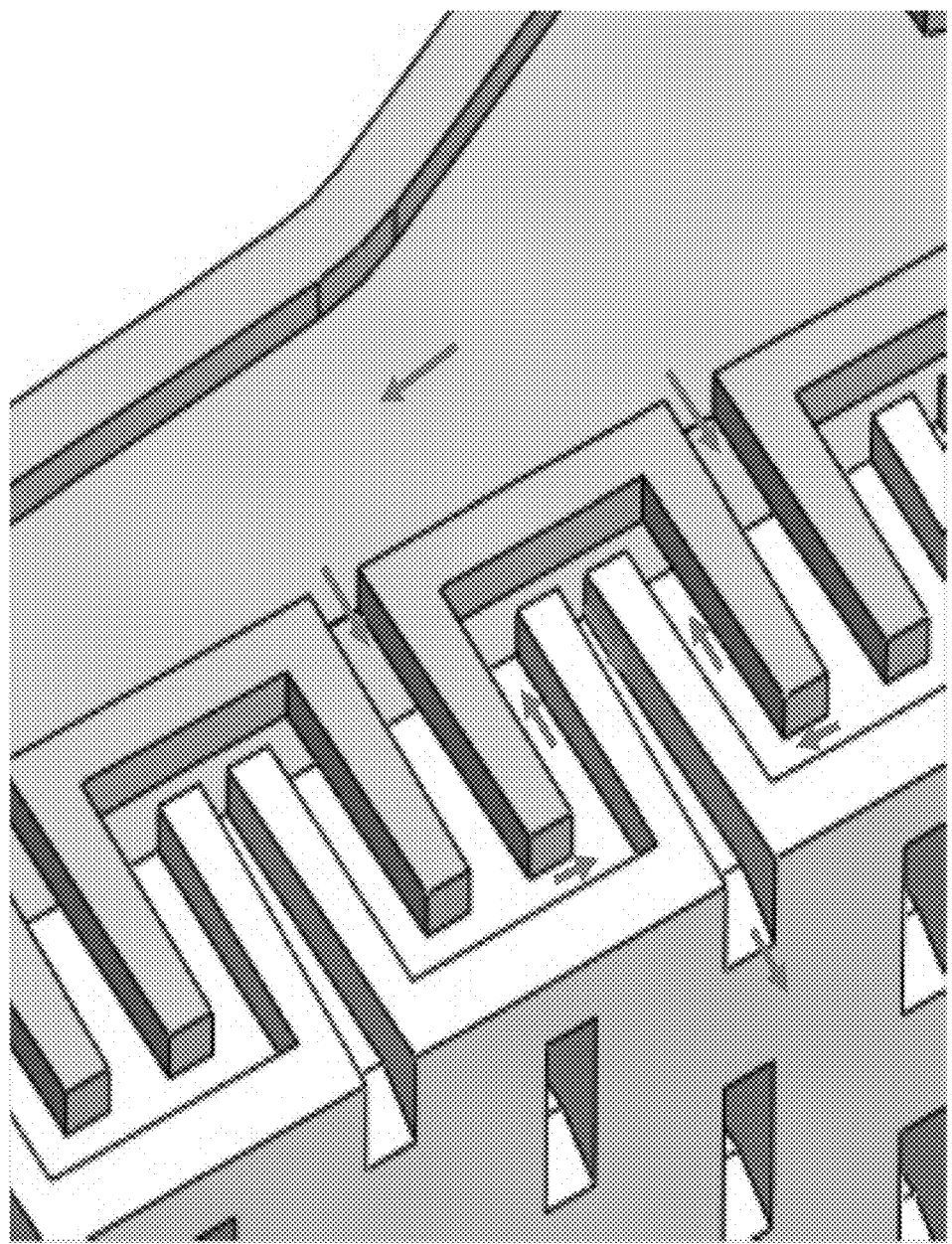
Figure 17A:
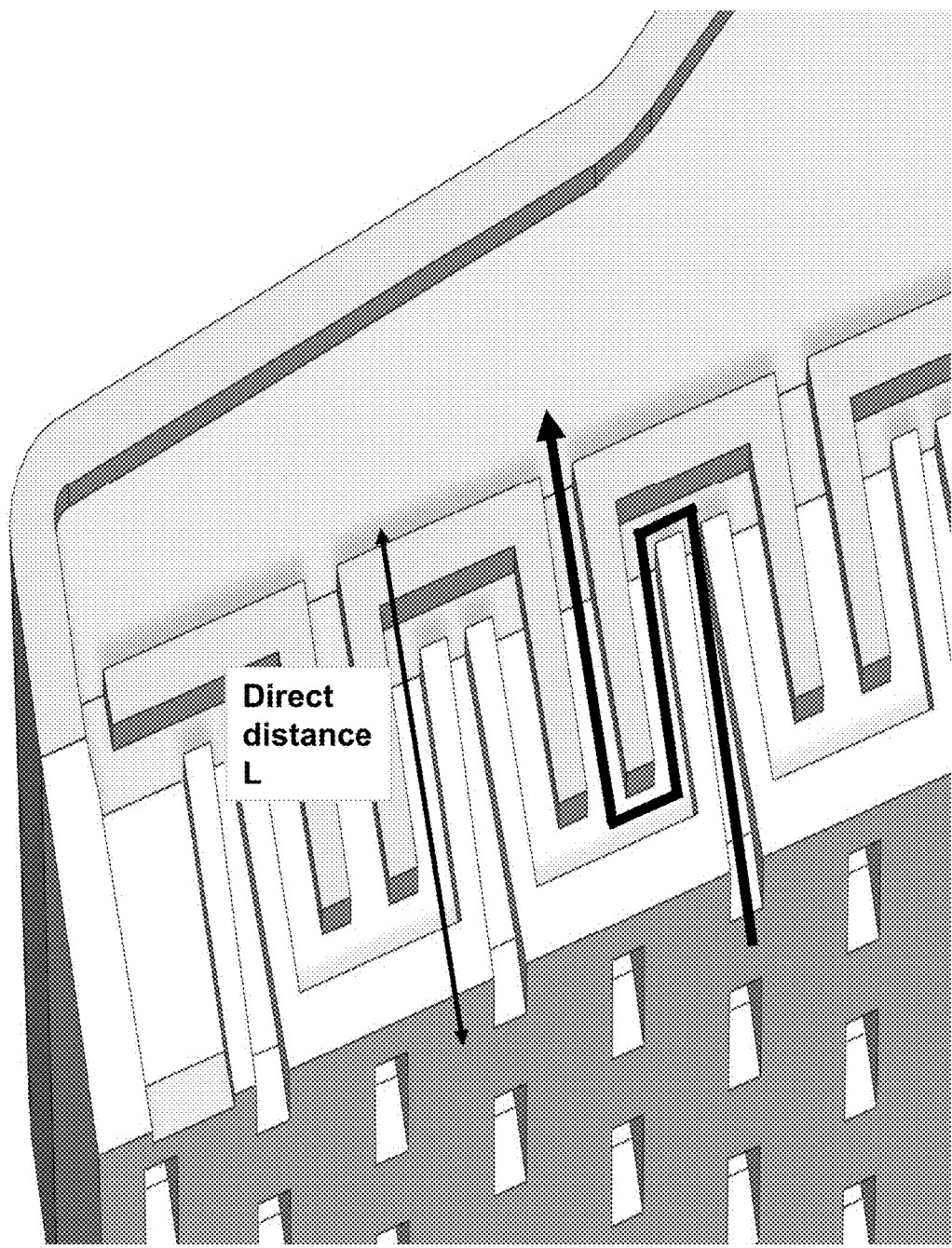

FIG. 16 shows the flow paths in a flow distributor that connects an inlet port to the cell stack. The flow directions would generally be reversed for the outlet manifold. FIG. 17 shows in detail the labyrinth flow path from a horizontal channel to a slot. For example, flow from the inlet port may travel first through the horizontal channel and then proceed through the plurality of openings that define the slots. The flow path may be defined by a series of connecting passageways that include two complete U-turns. For example, the first U-turn may include a flow path where liquid enters the slot from the horizontal channel and proceeds along a straight path of a predetermined length. The fluid then makes a turn at the beginning of a shorter section of a straight path to either the left or right, and then makes the same turn to either the left or right at the end of the shorter section of the straight path and then proceeding along a straight path. Likewise, the second U-turn may be executed in a similar manner, with the initial straight path defined by the last straight path of the first U-turn. As will be appreciated by one of skill in the art, the flow path and construction of the flow distributor is not limited to two complete U-turns, and may be configured to accommodate a plurality of U-turns. Other tortuous flow paths are within the scope of the disclosure. The baffles or protrusions may help define the tortuous flow path in that fluid may need to flow around them. Further, as shown in FIG. 17, the walls of the slots may be angled, to further guide the flowing fluid and define the tortuous flow path. FIG. 17A is another view of the labyrinth flow path and illustrates (as discussed further below) how tortuosity is correlated to the relationship between the length of the labyrinth flow path and the direct distance provided by flow path (L).

Figure 18:
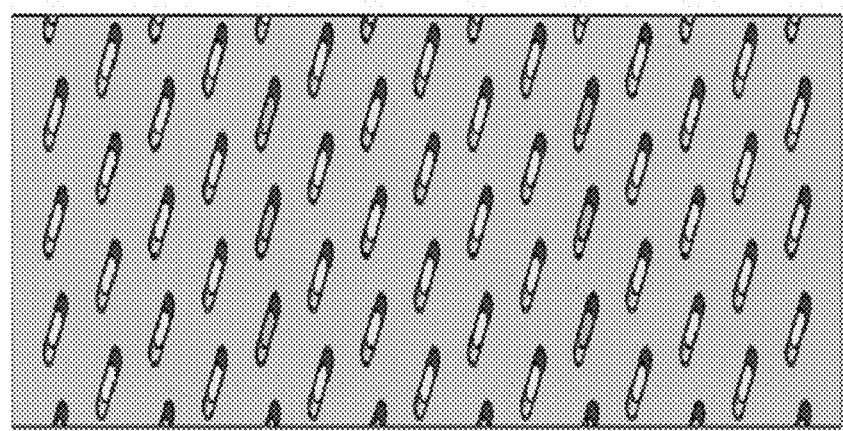
FIG. 18 presents a front view of flow distributor insert with angled slots in accordance with one or more embodiments.

As discussed above, in some embodiments the ports on the face of the flow distributor may be angled as illustrated in FIG. 18. The open areas of the slots, and therefore the pressure drops at the flow transition between the slots and the stack, may be the same as in an untangled version. The angle, however, may be configured such that fewer cell pairs are in fluid communication with each slot, and therefore bypass from a cell pair to another in contact with the same slot may be reduced.

In accordance with one or more embodiments, the dimensions and spacing of the vertical and horizontal flow passages may affect the flow distribution in the flow compartment in the stack and the overall pressure drop in the two streams. Computational Fluid Dynamics (CFD) software can be used to optimize the design. While a labyrinth flow path is one potential configuration, other embodiments include other flow configurations which present tortuous paths to potential bypass current so that the majority of the applied current would flow through the stack.

In accordance with one or more embodiments, the flow distributors are fabricated from materials with the requisite mechanical properties and chemical compatibility with the fluid to be deionized by electrochemical separation. In applications such as desalination of seawater plastic materials are favored because of their resistance to corrosion and low cost. Potential plastics include polyvinyl chloride (PVC), polyethylene (PE), polypropylene (PP), polyamides (PA or nylon), acrylonitrile butadiene styrene (ABS), polysulfone or blends of plastics such as Noryl, which is a blend of polyphenylene oxide (PPO) and polystyrene (PS). Reinforcing fillers such as glass fibers may be added for enhancement of chemical resistance and mechanical and thermal properties.

In accordance with one or more embodiments, the flow passages in the flow distributor may be configured to allow the electrical resistance along the passages to be much higher than the electrical resistance through the stack of membranes and spacers. This type of configuration may force most of the current to flow through the stack instead of bypassing around it.

The electrical resistance of a fluid filled passage may depend on the conductivity of the fluid and the cross-sectional area and length of the passage. To achieve a certain length, a passage may be tortuous if long straight passages are minimized or eliminated. As used herein, the term "tortuosity" may generally be defined as the length of the passage divided by the direct distance between the start and end of the passage. For example, in FIG. 17A the tortuosity is approximately 2.7. A high value for tortuosity may subsequently increase the fluid pressure drop through the passage. In at least one embodiment, the tortuosity may range from about 2 to about 5. In other embodiments, the tortuosity may range from about 2.5 to about 3.5.

In accordance with other embodiments, the tortuous passageway may be configured to have a nearly constant cross-sectional area. This particularly characteristic may enhance the uniformity of the flow velocity of fluid in the passageway. In various embodiments, the flow velocity at any point in the passageway may vary less than about +/−20%. In some embodiments, the velocity may vary less than about +/−10%. A uniform flow velocity may minimize or eliminate stagnant zones, thereby increasing the efficiency of the system.

In accordance with one or more embodiments, a frame may tightly support sides of a stack of cell pairs to maintain alignment. Ports may connect inlet and outlet manifolds to the flow compartments. This may promote uniform flow distribution across a width of flow compartments and reduce current leakage from compartments to manifolds. Membrane at the ends of a stack may be secured and sealed to the frame with o-rings, potting or other mechanism. A frame may be assembled from multiple sections or may be integral, such as molded as one part. Each modular unit may function as a one pass with a blocking membrane sealed in between modular units. Modular units next to endblocks may be separated from electrode compartments by membranes and may also be sealed, such as with o-ring or adhesive. A modular unit frame, or the manifold system of a modular unit frame, may generally include one or more dilute ports and one or more concentrate ports. The ports may be embedded in the frame or on a flow distributor insert. The modular unit frame may include manifolding and a flow distribution system that may include one or more inserts or flow distributors removably receivable by the frame. The modular unit manifold may be fluidly connected to larger overall system manifolding. The frame may include one or more recesses sized and shaped to at least partially receive a flow distributor insert. The overall frame and modular unit design may be configured to reduce bypass current. A bypass path may be tortuous and present higher resistance than a direct path through the stack.

In accordance with one or more specific non-limiting embodiments, a stack of cell pairs may be enclosed on four sides in a frame of unitary construction to form modular unit. The thicknesses of the flow compartments and the membranes are exaggerated for clarity. A set of manifolds in the frame section supplies the feed to the inlet of the dilute compartments via an array of slots oriented perpendicularly to the membrane surfaces. At the outlet of the dilute compartments, product water flows through a second array of slots and enters a second set of manifolds in the frame section at the right of the figure. A section perpendicular would include the same arrangement of manifolds and slots for the concentrate compartments. The inlet and outlet to the dilute and concentrate compartments may be isolated from each other by seals between the corners of the stack and the frame. The seals can be achieved by various techniques such as adhesives, thermal bonds or combinations thereof.

The frame of the overall design described above may serve several functions. It may maintain alignment of the cell pairs in the stack. Energy consumption in an ED device can be reduced by decreasing the thickness of the flow compartments and the membranes. Flow compartments (inter-membrane distance) in a current state of the art device can be as thin as 0.38 mm (0.015") while membrane thickness can be as low as 30 microns (0.0012"). A stack of 1200 cell pairs, assembled from such thin and flexible components has very little rigidity and should be supported from lateral shifting. The slots that connect the inlet and outlet manifolds to the flow compartments, when properly designed, can ensure that flow is uniformly distributed across the inlet of each dilute compartment. The slots are oriented perpendicular to the flow compartments. There is no need to line up the slots with the inlets of individual compartments. The slots reduce the area available for current leakage from the stack into the inlet and outlet manifolds and thereby the fraction of current which bypasses the stack of membranes and cell. Current bypass reduces current efficiency and increases energy consumption per unit volume of product. Other methods to improve current efficiency involve the use of multi-pass modular unit configurations using blocking membranes or spacers. In another embodiment, the configuration of the slots can be modified to further reduce current leakage and thus improve the current efficiency with the placement of blocks within the slots. From the inlet port, fluid may flow into the flow compartments in the stack via horizontal inlet manifolds in parallel followed by vertical slots. From the stack, the fluid flows to the outlet port though another set of vertical slots and outlet manifolds. Obstacles or obstructions may be placed in the slots to force the bypass current to take a more circuitous path and thereby increase the electrical resistance in the bypass paths. In some embodiments, blocks, such as horizontal blocks may be placed in the slots.

In some embodiments, systems and methods may support a stack of cell pairs on all sides by a frame. The frame can be as deep as necessary to accommodate the number of cell pairs in a stack. The frame may have ports which connect the inlet and outlet manifolds for the dilute and concentrate streams to their respective flow compartments in the stack. Among the expected benefits of such a design is reduction of current bypass by elimination of the open areas at the inlets and outlets to the stack. A stack of cell pairs can be potted at the corners in a frame to form a modular sub-block that can be checked for cross-leaks, desalination performance and pressure drop. Multiple blocks can be stacked to form a modular unit. Blocking membranes can be inserted between the blocks to direct the dilute and/or concentrate stream into multiple-pass flow configurations.

The frame may have recesses to receive inserts and ports for manifolding. The inserts may be installed before the stack is potted to the frame. Each horizontal passage may be in fluid communication with a number of vertical passages in parallel and the horizontal passages may be in fluid communication with each other via the port manifold. Not all of the flow passages have to be placed in the inserts. Horizontal grooves can be located in the frames to provide the horizontal flow passages while the vertical slots can be located in the inserts. Other options are possible. Selection of the best frame and insert design for a cross-flow modular unit will be affected by the relative complexity and costs of component fabrication and assembly.

In accordance with one or more embodiments, methods may reduce current bypass in cross-flow ED devices. In some embodiments, flow passages in a sub-block frame may reduce the fraction of current that bypasses the stack and thereby increase current efficiency. The passages may connect the inlet and outlet ports to the flow compartments in the stack of cell pairs.

By proper sizing of the passages, the electrical resistance of the convoluted paths for the bypass current can be made significantly higher than the resistance of the direct path through the stack. The majority of the current can therefore be forced to flow through the stack. In at least some embodiments, at least 70% of the current may flow through the stack and therefore at least about 70% current efficiency may be achieved. In at least some embodiments, at least 80% of the current may flow through the stack and therefore at least about 80% current efficiency may be achieved. In at least some embodiments, at least 90% of the current may flow through the stack and therefore at least about 90% current efficiency may be achieved.

The flow passages adjacent to the stack are oriented vertically so that each communicates with several cell pairs. They may be staggered vertically in a definite pattern so that every flow compartment is in communication with multiple vertical passages. The dimensions and spacing of the vertical and horizontal flow passages affect the flow distribution in the flow compartment in the stack and the overall pressure drop in the two streams.

In some embodiments, the internal flow passages may be formed in a block of material. The internal flow passages may be integral to the frame. In other embodiments, at least a portion of the flow passages may be formed in a separate section of material and then inserted into the frame. For example, an insert may include a portion of the flow passages. An insert may include slots and/or grooves that are fabricated separately and then installed in a frame.

In accordance with one or more embodiments, an insert as discussed herein may be designed to promote even flow distribution and with lower pressure drop across a membrane in a flow through an electrochemical separation device. Even flow distribution may help prevent scaling in spacers and improve current efficiency. Inlet and outlet port location and an insert's opening size may be varied to impact flow distribution. CFD software may facilitate evaluation of flow distribution and pressure drop. Lower pressure drop may lead to a lower pumping requirement. Modular unit cost may also be reduced as the modular unit may be built with thinner material. Inserts may act as a flow distributor and improve current efficiency. The size of ports or slots may be varied on the insert to vary flow distribution. In some embodiments, the size of slots on the insert may be varied at different locations.

In accordance with one or more embodiments, a cell stack may be secured within a frame or support structure comprising an inlet manifold and an outlet manifold to provide a modular unit or modular unit. This modular unit may then be secured within a housing. The modular unit may further comprise a bracket assembly or corner support that may secure the modular unit to the housing. A second modular unit may be secured within the housing. One or more additional modular units may also be secured within the housing. In certain embodiments of the disclosure, a blocking spacer may be positioned between the first modular unit and the second modular unit.

In some non-limiting embodiments, stacks of cell pairs with dilute and concentrate compartments in single-pass flow configurations may be sealed in sections to form modular units. The units may be joined together with blocking spacers in between to form multiple pass configurations. The stacks may be sealed to the housing section using adhesive at corners. The blocking spacers do not have to be sealed to the inside wall of the housing but are instead sandwiched between modular units and sealed between the ends. In some non-limiting embodiments, two modular units with flanges at ends may be stacked with a blocking spacer in between. The flanges may be bolted together. The blocking spacer may be molded with a frame and sealed between the flanges with adhesives or gaskets. Alternatively, the frame may be molded of a thermoplastic material or other fabrication method. In some embodiments, modular units may be connected with clamps or tie bars. The design of the blocking spacer may be modified accordingly.

This invention is not limited in use to electrodialysis equipment. Other electrochemical deionization device such as electrodeionization or continuous electrodeionization can also be constructed using a cross-flow configuration with multiple passes using a modular design. Electrochemical separation systems in accordance with at least some embodiments may be used for desalination of seawater, brackish water and brines from oil and gas production.

The function and advantages of these and other embodiments will be more fully understood from the following examples. The examples are intended to be illustrative in nature and are not to be considered as limiting the scope of the embodiments discussed herein.

EXAMPLE

Flow Distributor with Tortuous Flow Path

Figure 19:
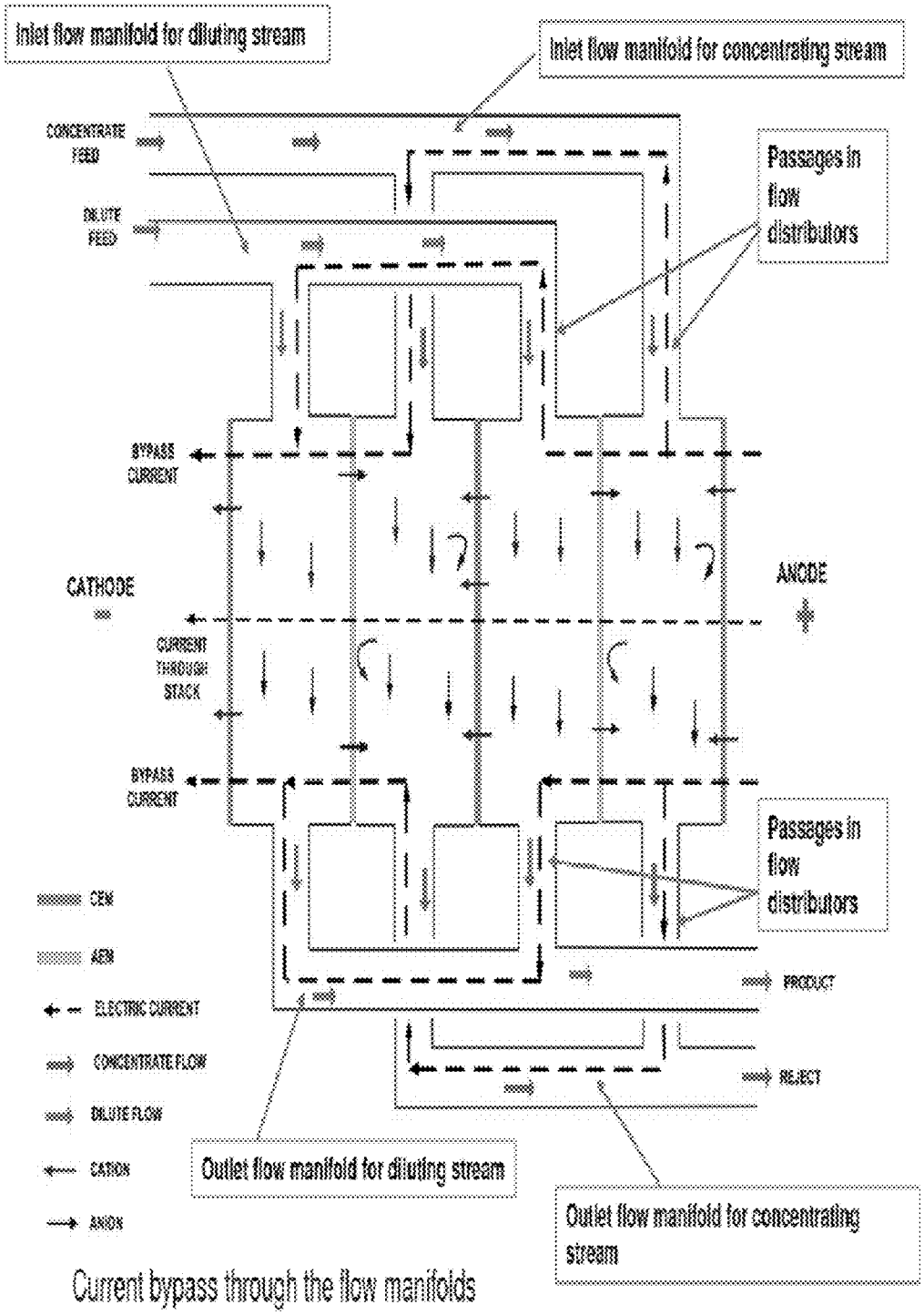
FIG. 19 presents a schematic of transport processes in an ED device in accordance one or more embodiments.
Figure 20:
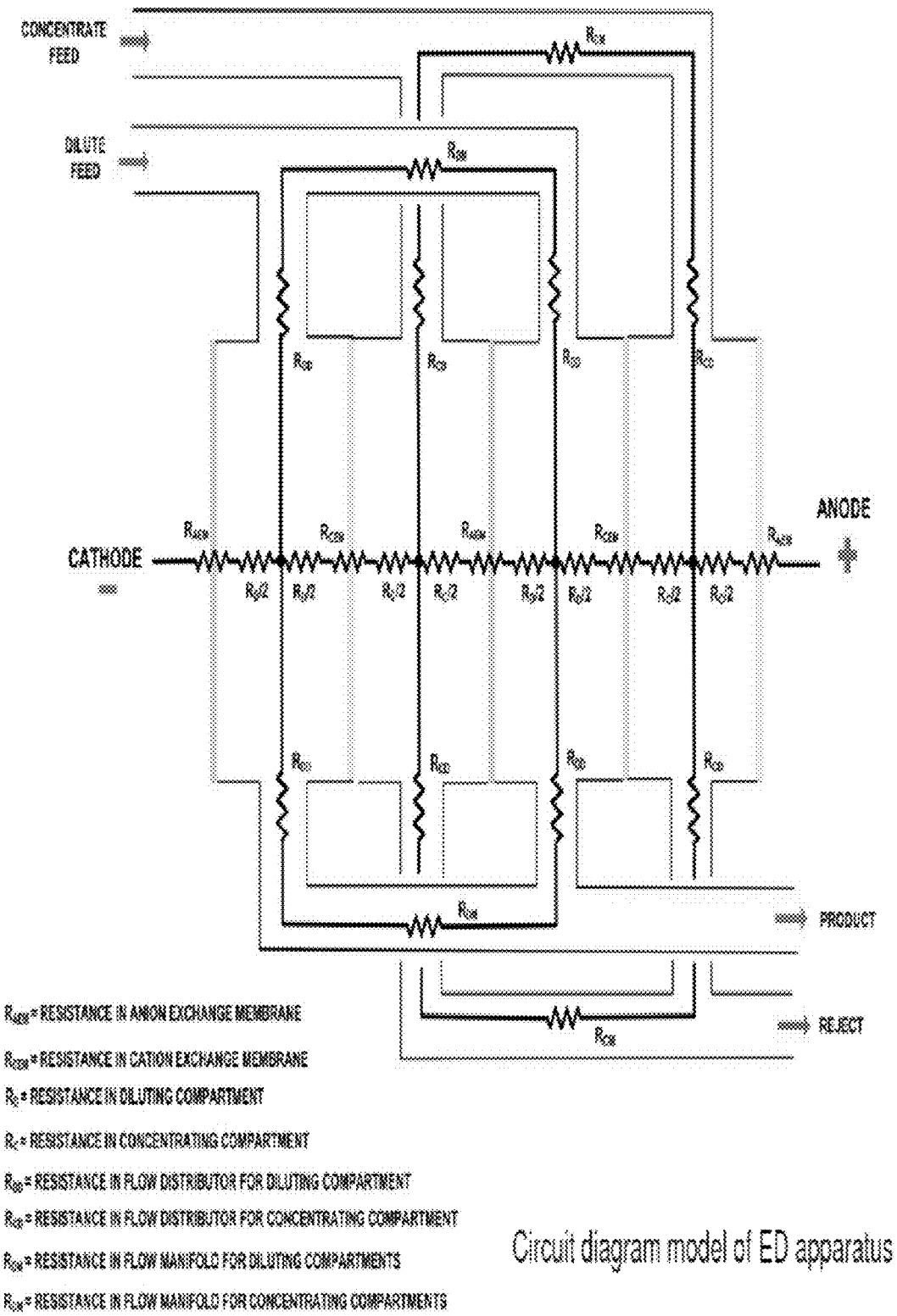
FIG. 20 presents a circuit diagram of an ED device in accordance with one or more embodiments.

FIG. 19 presents a transport process flow diagram of an ED device. In FIG. 19, the flow path for the diluting and concentrating streams is shown as it is transported from the inlet to the outlet flow manifold. Also shown is the flow path of the current bypass through the device, which may lead to system inefficiency. FIG. 20 presents a circuit diagram of an ED device. The diagram illustrates the various resistances that correlate with the different components and flow paths of the device.

FIG. 19 illustrates an ED apparatus with two cell pairs showing the movement of ions through the membranes and the current paths. A fraction of the total current from the anode to the cathode may pass through the passages in the flow distributors and the flow manifolds and bypass the stack of membranes and spacers. This fraction of current does not result in ion movement and is considered non-useful. The current paths in an ED apparatus can be approximated by an electrical circuit, as shown in FIG. 20. The electrical resistance in the diluting and concentrating compartments, the cation and anion membranes, the flow passages in the flow distributors and the flow manifolds are modeled as resistors.

In various aspects, a flow distributor as described and characterized herein may overcome one or more of the disadvantages discussed above. For example, a flow distributor with tortuous passageways and as illustrated in FIG. 16 was shown to have resistances calculated as follows:
1. The feed to both the diluting and concentrating compartments was assumed to be seawater with total dissolved solids (TDS) of 35000 ppm, temperature of 25° C. and conductivity of 53.1 µS/cm.
2. Each tortuous passage had a width of 2.5 mm (0.1"), a height of 4 mm (0.16"), and a length of 53 mm (2.09"). The ion exchange membranes had a resistance of 1.3 ohm-cm$^2$. There were 13 passages fluidly in parallel in each row.
3. The diluting and concentrating compartments were 0.25 mm (0.01") thick.
4. Each membrane is 305 mm (12") square with membrane utilization of 85%

The resistances in the circuit diagram in FIG. 20 were calculated using simplified calculations that did not take into account, for example, the "shadow effect" of screens in the diluting and concentrating compartments on the available membrane area. The results were approximately as follows:
$R_{AEM}=R_{CEM}=0.0016$ ohm
$R_D=R_C=0.00066$ ohm
$R_{DC}=R_{CC}=632$ ohm The results indicate that the resistances of the membranes and the diluting and concentrating compartments are much lower than the resistances in the flow distributors. The fraction of total current that bypasses the stack of membranes and diluting and concentrating compartments is therefore negligible in this example.

It is to be appreciated that embodiments of the methods and apparatuses discussed herein are not limited in application to the details of construction and the arrangement of components set forth in the description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

The invention claimed is:
1. A flow distributor for electrochemical separation, comprising:

a plurality of horizontal passages in fluid communication with an inlet fluid manifold associated with an electrochemical separation device;
a plurality of vertical passages configured to transport fluid to at least one compartment of the electrochemical separation device;
a plurality of cavities, at least one cavity of the plurality of cavities formed between adjacent vertical passages of the plurality of vertical passages; and
a plurality of protrusions mated with the plurality of cavities to form a labyrinth flow path from the inlet fluid manifold to the electrochemical separation device,
wherein the labyrinth flow path is characterized by fluid flow from the inlet fluid manifold to the plurality of horizontal passages, from the plurality of horizontal passages to the plurality of cavities, around the protrusions within the cavities to the plurality of vertical passages, and from the plurality of vertical passages to the electrochemical separation device.

2. The flow distributor of claim 1, wherein the plurality of vertical passages are arranged in parallel, and wherein the plurality of horizontal passages are arranged in parallel.

3. The flow distributor of claim 1, wherein the labyrinth flow path is defined by a tortuosity of from about 2 to about 5.

4. The flow distributor of claim 1, having a first side configured to be disposed proximate a cell stack of the electrochemical separation device, wherein the flow distributor comprises a plurality of ports on the first side, and further having a second side arranged opposite the first side, wherein the flow distributor comprises a plurality of ports on the second side and the ports on the first side are fluidly connected to the ports on the second side via the labyrinth flow path.

5. The flow distributor of claim 4, wherein the plurality of ports on the first and second sides comprise slots.

6. The flow distributor of claim 5, wherein each port on the first side of the flow distributor is oriented substantially perpendicularly to a first side of compartments of the electrochemical separation device, and wherein each port on the second side of the flow distributor is oriented substantially parallel to the first side of compartments of the electrochemical separation device.

7. The flow distributor of claim 6, wherein at least one port on the first side of the flow distributor is in fluid communication with two or more compartments of the electrochemical separation device.

8. A modular flow distributor for electrochemical separation, comprising:
a first component constructed and arranged to define a plurality of vertical passages configured to transport fluid to or from at least one compartment of an electrochemical separation device and a plurality of cavities such that at least one cavity of the plurality of cavities is formed between adjacent vertical passages of the plurality of vertical passages; and
a second component constructed and arranged to define a plurality of horizontal passages and comprising a plurality of protrusions, the second component configured to mate with the first component such that the protrusions are arranged with the plurality of vertical passages, the plurality of cavities, and the plurality of horizontal passages to form a labyrinth flow path between the electrochemical separation device and a fluid manifold.

9. The modular flow distributor of claim 8, wherein the labyrinth flow path is defined by a tortuosity of from about 2 to about 5.

10. The flow distributor of claim 1, wherein at least a portion of each protrusion of the plurality of protrusions extends into at least one cavity of the plurality of cavities.

11. The modular flow distributor of claim 8, wherein at least a portion of each protrusion of the plurality of protrusions extends into at least one cavity of the plurality of cavities.

\* \* \* \* \*